(12) United States Patent
Lundbäck

(10) Patent No.: US 10,533,636 B2
(45) Date of Patent: Jan. 14, 2020

(54) COMPOUND PLANET GEAR ARRANGEMENT AND DRIVE TRAIN ARRANGEMENT

(71) Applicant: Cascade Drives AB, Stockholm (SE)

(72) Inventor: Stig Lundbäck, Vaxholm (SE)

(73) Assignee: Cascade Drives AB, Stockholm (SE)

( * ) Notice: Subject to any disclaimer, the term of this patent is extended or adjusted under 35 U.S.C. 154(b) by 109 days.

(21) Appl. No.: 15/762,788

(22) PCT Filed: Sep. 23, 2016

(86) PCT No.: PCT/SE2016/050902
§ 371 (c)(1),
(2) Date: Mar. 23, 2018

(87) PCT Pub. No.: WO2017/052461
PCT Pub. Date: Mar. 30, 2017

(65) Prior Publication Data
US 2018/0291984 A1 Oct. 11, 2018

(30) Foreign Application Priority Data
Sep. 23, 2015 (EP) .................................... 15186568

(51) Int. Cl.
*F16H 1/28* (2006.01)
(52) U.S. Cl.
CPC .................. *F16H 1/2863* (2013.01)
(58) Field of Classification Search
None
See application file for complete search history.

(56) References Cited

U.S. PATENT DOCUMENTS

| 1,225,360 | A | * | 5/1917 | Royce | ................... | F16H 1/2836 |
| | | | | | | 475/346 |
| 2,759,376 | A | * | 8/1956 | Chamberlin | .......... | F16H 1/2809 |
| | | | | | | 475/338 |

(Continued)

FOREIGN PATENT DOCUMENTS

| CN | 1366590 A | 8/2002 |
| CN | 103322137 A | 9/2013 |

(Continued)

OTHER PUBLICATIONS

Fox, F. et al., "Use of the Integrated Flexpin Bearing for Improving the Performance of Epicyclical Gear Systems" 2003, Proceedings of Detc. Asme. Design Engineering Technical Conferences and Computers and Information in Engineering Conference, vol. 48, pp. 1003-1011.

(Continued)

*Primary Examiner* — Dirk Wright
(74) *Attorney, Agent, or Firm* — RMCK Law Group, PLC

(57) ABSTRACT

A compound planet gear arrangement (100, 200, 300, 400) having a ring gear (110, 210, 310, 410), at least two planet gear units (120, 220, 329, 429) and a sun wheel (130, 230, 330, 430). Each planet gear unit comprise a primary planet gear (121, 221, 321, 421) with primary planet teeth meshing with the ring gear and a secondary planet gear (122,222, 322, 422) with secondary planet teeth meshing with the sun wheel. The secondary planet gear is axially connected with the primary planet gear and has a diameter which is larger than the diameter of the primary planet gear Each planet gear unit (120, 220, 320,420) comprises a shock absorbing transmission arrangement (20) which is arranged to allow a limited elastic rotation of the secondary planet teeth relative to the primary planet teeth. A drive train arrangement (Continued)

comprising such a compound planet gear arrangement is also disclosed.

21 Claims, 10 Drawing Sheets

(56) References Cited

U.S. PATENT DOCUMENTS

| | | | |
|---|---|---|---|
| 3,090,258 A * | 5/1963 | Zinik | F16H 1/46 |
| | | | 475/338 |
| 3,303,713 A | 2/1967 | Hicks | |
| 4,674,351 A | 6/1987 | Byrd | |
| 4,831,897 A | 5/1989 | Dobbs | |
| 5,533,943 A | 7/1996 | Ichioka et al. | |
| 5,554,082 A | 9/1996 | Umeyama et al. | |
| 6,459,165 B1 | 10/2002 | Schoo | |
| 8,535,198 B2 * | 9/2013 | Fong | F16H 1/2863 |
| | | | 475/331 |
| 8,734,289 B2 | 5/2014 | Pinnekamp et al. | |
| 8,907,517 B2 | 12/2014 | Mongeau et al. | |
| 2003/0015052 A1 | 1/2003 | Hulshof | |
| 2010/0081534 A1 | 4/2010 | Kanervo | |
| 2010/0113210 A1 | 5/2010 | Lopez et al. | |
| 2010/0240490 A1 | 9/2010 | Schafer | |
| 2012/0302395 A1 | 11/2012 | Poon | |
| 2013/0203553 A1 | 8/2013 | Fong et al. | |

FOREIGN PATENT DOCUMENTS

| | | | |
|---|---|---|---|
| DE | 102007053509 A1 | 1/2009 | |
| DE | 102012013834 A1 | 1/2014 | |
| EP | 3379107 A1 * | 9/2018 | ............ F16H 3/663 |
| TW | 201333347 A | 8/2013 | |
| WO | 2007119074 A1 | 10/2007 | |
| WO | 2014140555 A2 | 9/2014 | |
| WO | 2015091405 A1 | 6/2015 | |
| WO | 2015091406 A1 | 6/2015 | |

OTHER PUBLICATIONS

Goch, G. et al., "Precision engineering for wind energy systems," CIRP Annals—Manufacturing Technology 61 (2012) 611-634.

Guo, Y. et al., NREL Conference paper; NREL/CP-5000-55355; "Dynamic Analysis of Wind Turbine Planetary Gears Using an Extended Harmonic Balance Approach," Preprint dated Jun. 2012, 18 pp.

International Search Report and Written Opinion for International Application No. PCT/SE2016/050902 dated Aug. 12, 2016, 14 pages.

Horste, A. et al., "Gear box failures in onshore wind power systems," Elforsk report 10:50, 2011, 49 pages.

Chinese Office Action for CN Application No. 201680065479.4 dated Apr. 1, 2019, 7 pages.

* cited by examiner

COMPOUND PLANET GEAR ARRANGEMENT AND DRIVE TRAIN ARRANGEMENT

CROSS-REFERENCE TO RELATED APPLICATIONS

This application is a 371 U.S. National Stage of International Application No. PCT/SE2016/050902, filed Sep. 23, 2016, which claims priority to European Application No. 15186568.0, filed on Sep. 23, 2015. The disclosures of each of the above applications are incorporated herein by reference in their entirety.

TECHNICAL FIELD

The invention relates to a compound planet gear arrangement for transmitting torque by splitting the torque into several torque transmitting gear components. The invention also relates to a drive train arrangement comprising at least two such compound planet gear arrangements forming a respective gear step of the drive train arrangement.

BACKGROUND

There are many applications where there exists a need for transforming rotational motion or torque into another rotational motion and torque. In most cases some kind of planetary and compound planetary gear arrangements may be used for such rotation to rotation arrangements.

Examples of such applications are devices as wind and fluid power mills where it is necessary to transform high torque at low RPM to lower torque with higher RPM. Other examples are motors in cars and trucks, turbines, electric motors and other driving arrangements where it is necessary to convert high RPM and low torque to high torque with low RPM.

At gear arrangements, such as planetary gears, where the transmitted torque is split between several gear components there exists a problem with over determination of the gear arrangement. Such over determination may lead to unbalanced load and uneven wear of the gear components. The present invention is concerned not only with solving problems related to over determination but also to provide shock absorption to reduce transient forces occurring in the gear arrangement when the transmitted forces through the gear arrangement changes drastically. At these types of gear arrangements it is of vital interest that the entire arrangement is durable and has a long and predictable service life. A further important aspect is that volume-weight ratio is as low as possible to the gear-ratio.

The present invention may be used at various applications of the above mentioned type and also in others. An application of certain interest to demonstrate how the present invention can improve the functionality of gear arrangement is the wind power generation industry. In this industry planetary gearboxes play a central part of the driveline from the turbine or rotor blades to the generator for generation of electrical power.

Turbulent winds changes due to large masses in motions, the propeller and generator, give rise to sudden and strong changes of the force direction through the gearbox. This change of direction together with the air gap and stiffness within the gearbox drive train results in shock waves and high overloads on the meshing teeth and in the bearings. Metal contacts between the gear teeth, will contaminate the oil in the gearbox. Optimizing oil qualities to RPM viscosities and cleanness is very important. To extend the lifetime even further it is necessary to create gearboxes where vulnerable parts can be replaced in place with new better optimized components, such as bearings and gears.

Furthermore, as described in NREL Conference paper; NREL/CP-5000-55355; "Dynamic Analysis of Wind Turbine Planetary Gears Using an Extended Harmonic Balance Approach, Preprint dated June 2012, by Y. Guo, J. Keller and R. Parker, transient forces is very common in windmills and might have a negative lifetime factor on this kind of arrangement to achieve even distributions of split torque through the gearboxes.

The cause of the low lifetime of windmill gearboxes is still not fully known though many different kinds of epicyclical gearboxes have been tested. Many windmill manufacturers are today looking for direct driven permanent magnet though they become very large, heavy and expensive using earth metal that is a limited recourse.

A gearbox is a device for power transmission which changes the rotation speed, torque and/or rotation from one rotating shaft to another. This power transfer between the axles is usually made through a collaborative meshing between two cylindrical gears. This means that only two tooth sides at a time with the rolling and sliding movements transmit the current torque. The meshing must, with its two mating tooth flanks, be dimensioned for the torque transmitted between the gears. This may be done by varying the gear diameter, width and meshing. Gear materials and hardness of the tooth flanks as well as the oil that lubricates the gearbox naturally constitute extremely important factors for increased strength and increased resistance to mechanical abrasions. In cylindrical gear boxes an upshifting occurs when a larger diameter driving gear meshes with a gear with smaller diameter driven gear. Correspondingly, downshifting occurs when a smaller diameter driving gear meshes with a larger diameter driven gear. At applications requiring high up- or downshifts, several gear steps can be needed. A first step of e.g. 1:5 could be complemented by a second step of e.g. 1:5, resulting in a total upshift of 1:25. If two meshing tooth flanks must be adapted for large input torques such as e.g. at extraction of wind energy to generate electrical energy, cylindrical gear arrangements can lead to large and heavy gearboxes in relation to its gear ratio. To avoid this problem various different planetary gearboxes have been suggested for providing a compact, energy-dense gear arrangement with high speed ratio, where speed ratio is to be understood as input speed in relation to output speed of the input and output shafts of a gear box.

The planetary gearboxes are built around three types of elements, the planetary gear, planet carrier and the main gear consisting of an outer ring gear or ring wheel and an internal sun gear or sun wheel. With this type of gearbox it is possible to split incoming torques onto several planet gears that are cooperating in transforming torque through the gearbox, between the ring gear and the sun gear.

The planetary gearbox can be made in many ways, but most usually as a single or a compound transmission gearbox. In single planetary gearboxes, a number of single planetary gears transform torque directly between the ring gear and the sun gear.

In compound planetary gear transmissions the torque is transmitted from the ring gear to the sun gear via a number of planetary gear sets, each planetary gear set comprising at least two planetary gears one of which is meshing with the ring gear and one of which is meshing with the sun gear. The planetary gears in each set may, in compound planetary gearboxes, either be in meshing contact with each other or, as in stepped compound planetary gearboxes, be fixed to each other by means of a common shaft. Such compound planetary gear arrangements can generate higher speed ratio than single planetary transmission gear boxes.

The planetary gear box carrier can in some embodiments be connected to the transmission input/output shaft, and thus, with a fixed ring gear, transform torque through its rotating planetary gears to the sun gear and its connection to the output/input shaft. In other examples, the carrier may be fixed to the gearbox which in turn means that the ring gear is connected to the gearbox input/output shaft. The rotating ring wheel conveys thus torque through the fixed planetary carrier with its rotating planetary gears that transform torque to the sun gear that is connected to the output/input shaft.

It is extremely important with split transmission that the transforming of torque is evenly distributed onto the cog flanks that are involved.

With three planetary gears used in a single planetary gear box construction, the sun gear can be centred through the three planetary gear tooth flanks, and by physical and geometric reasons give possibilities to generate even force transmission distribution between the ring gear and sun gear.

In many planetary gear boxes, used for wind turbines, cars etc., three planetary gears in 1-3 steps as single planetary constructions are used to convey incoming primary torque between the ring gear and sun gear.

With three planetary gears in a single transmission gearbox it is possible with internal gearing of the ring wheel, to achieve a gear ratio of about 1:12. At this high gear ratio the sun wheels and its shaft will be disproportional in size and thus usually lower gear ratios are used in practice. With four planetary gears in a single planetary gearbox it may be possible to accomplish a gear ratio of about 1:5.2, with six planetary gears approx. 1:2.5 and with eight planetary gears approx. 1:2, before the planetary gears starts to hit each other.

PRIOR ART

U.S. Pat. No. 6,459,165 concerns wind power generation and discloses a two-stage planetary gearbox with three planet gears in each step. The rotating planet carrier of the first stage transmits torque through three planetary gears to a sun gear centred through the planetary gear tooth flanks. This sun gear conveys further the torque via a driving mean to rotate the planet carrier in the in a second step that trough three additional planetary gears transform tongue to a sun wheel attached to a shaft powering the generator at a total gear ratio of approximately 1:16. In other patents similar arrangements are further equipped with another planet gear stage and or fixed-axis gear systems to improve the gear rate and reduce the size, weight and cost of the generator. By such arrangements with three planet gears the first sun gear, the second planet carrier with its three planets and helical cut cogs will create free floating unit centred and stabilized by only the cog wheel flanks.

In theory, the above arrangement should not involve over determination problems but gravity may be a certain concern.

Another downside to use only three planetary gears in the first step is that a large primary torque only can be divided on to three pairs of cog wheel flanks which require large cog wheel diameters and sizes to cope with torque that is transformed over three planetary wheels and the sun wheel. The load onto the bearings will be high resulting in bearings having larger sizes and diameters that even can be larger than the gear itself, if not hydro mechanical plain bearings are used. Further, larger diameter ball or roller bearings reduce their tolerances to RPM according to an exponential function.

In other planetary gear boxes, used for wind turbines, cars etc, four planetary gears in 1-3 steps are used to convey incoming primary torque between the ring gear and sun gear. Splitting the incoming torque into 4 pathways through the gearbox will decrease the sizes of the gears and bearings but will also reduce the gear ratio to be about 1:4. Further, in these cases there are no possibilities to have a free floating sun gear. Instead, even load distribution is here sought to be achieved by increasing the precision in the manufacture of gears, shafts, bearings, centring, elasticity, etc.

In order to further minimize over determinations, gear shafts some times are equipped with a flex pin arrangement such as disclosed in U.S. Pat. No. 3,303,713.

Single step planetary gear arrangements comprising four planetary gears allow, due to geometrical reasons, gear ratios at a maximum of about 1:5.2 and in practice usually a gear ratio of 1:4 is achieved. When arranged as a two step gear arrangement this will give a gear ratio of 1:16. In order to improve the gear ratio and reduce the size of the driven generator a third planetary gear stage may be added such as disclosed e.g. U.S. Pat. No. 8,907,517. In other known arrangements, a third gear step may be arranged as a fixed axis gear system that also solves the other big issue in gear trains concerning wind power to have a central open contact through the hole in central shaft for power support and control of the wind turbine.

Compound planetary gearboxes, some times referred to as hybrid stepped planetary solutions, have two linked planetary gears, a primary and a secondary, with different diameters, fixed onto one common shaft in one compound gear step. This arrangement transform torque with high theoretical gear ratio, but with consideration of other issues concerning the gearbox, the gear ratio with three pairs of linked planetary gears in practice will be in a region of 1:15 to 1:20.

Even though such compound stepped planetary gear arrangements theoretically exhibits great gear ratios, compact constructions, high energy densities and high speed ratios, the stepped planetary gears have not in practice been used to a large extend within e.g. the windmill industry. It has turned out that such known stepped gear arrangements frequently exhibits the following problems:

They require very precise machining and measurements to prevent over determination, due to double meshing contacts between two different gears with an exact fixation to one common shaft makes manufacturing and assembling more difficult and results in greater risks of failure.

Stepped planetary gears with four planets at the same level will reduce the gear rate and make this solution less attractive.

US 2010/0113210 A1 discloses a compound planetary gearbox where the secondary planet gears are stacked in two axial levels thus creating a split torque from an internally geared ring wheel to a central sun gear. The document discusses the problem of over determination but fails to suggest at a satisfactory solution usable for all embodiments described therein.

In U.S. Pat. No. 8,734,289 B2 a plurality of identically shaped first and second planet shafts equipped with a primary and a secondary planet gear that are stacked both in axial and with the second planet shaft in radial directions forming a sector to transform split torque from an external ring gear to a central sun gear. Smaller diameter gears will provide better machining and measuring conditions to achieve even flank pressures on the involved gears. The drawback is an extra gear step to achieve the same gear rate as e.g. is described in US 2010/0113210.

US 2003/0015052 A1 presents a gearbox with a plurality of identically shaped first, second and third planet shafts equipped with a primary and a secondary planet gear where the first and second planet shafts with their planets are stacked on both sides of an externally cut ring gear, forming two sectors with two first planet shafts that with their planet gears are meshed together with the planet gears of the second planet shaft and where these two sectors are mashed together with the third planet shaft and its planet gears to transform half of the torque generated by the ring gear as split torque to a driving shaft of an generator.

Stacking the second planetary gears in two levels improve the possibilities to achieve high speed ratios and double the split torque gear functions through the gearbox, but will result in that six, eight or more cogwheels in further different positions in the gearbox have to be secured to mesh with even cog-flank pressures.

At higher torques to be transmitted through the gearbox, at least one of the gears has to be fixated to the shaft by e.g. splines that further dramatically increase the risk of misalignment and create over determinations of one or many cog-flanks.

Larger cogwheels are difficult to measure and adjust to have exact masking parameters.

US 2010/0240490 A1 discloses a planetary gear unit. It comprises split planet gears with two subgears of equal diameter which are mutually preloaded relative to each other by spring bars arranged parallel to the planetary axis of rotation. The arrangement is said to result in a backlash-free planetary gear unit.

A damage report concerning all Swedish windmills made by the Swedish Elforsk report 10:50 2011 and CIRP Annals—Manufacturing Technology 61 (2012) 611-634 concluded that the gearboxes generally not lasted longer than about half the promised service life of 20 years. The result shows that the gearbox designers fails to take all the internal dynamic forces into consideration.

U.S. Pat. No. 4,674,351 discloses a compliant gear. The document describes that earlier attempts to create compliant gears to be used for shock absorbance, reduced tolerances requirements between meshing gears and noiseless gears has failed due to lack of radial stiffness to maintain centreline distance between the meshing gears. The document suggests to increase the radial stiffness of the compliant gear by intrusion of rigid shim as sandwich construction between a compliant laminate. That was followed by other similar constructions like U.S. Pat. No. 4,831,897A or just by providing the gear with bendable sprockets inside cogwheel WO2007119074A1 or in a hub connected to the cogwheel as in DE102007053509A1.

SUMMARY OF THE INVENTION

An object of the present invention is to provide an enhanced compound stepped and/or stacked planet gear arrangement.

Another object is to provide such a compound planet gear arrangement having shock absorbing properties for reducing the negative effects of transient torque variations acting on the input shaft.

A further object is to provide such a compound planet gear arrangement which efficiently reduces the problems caused by over-determination, at a high degree of freedom allowing equal load distribution between a plurality of gears sharing the total load.

A still further object is to provide such a compound planet gear arrangement exhibiting a high gear ratio, high energy density and high speed ratio.

Yet another object is to provide such a compound planet gear arrangement which may easily be assembled and disassembled and which readily allows maintenance.

Still another object is to provide such a compound planet gear arrangement, which allows for that a wind turbine arranged to drive the gear box may be readily controlled in a space saving manner while requiring only small modifications of a limited part of a gear arrangement connecting the turbine to a generator.

Another object is to provide such a compound planet gear arrangement at which the dimensions of constituent components, such as sun wheels, may be kept small while still allowing optimal gear ratios.

Yet another object is to provide such a compound planet gear arrangement, which allows for that a composed gear arrangement forming a drive train may be readily assembled by combining modular components.

A further object is to provide such a compound planet gear arrangement, which is adapted to be used in windmills for efficient extraction of electric energy from heavily varying winds exhibiting large degrees of turbulent flows.

Still another object is to provide such a compound planet gear arrangement which allows for that an in- or outgoing shaft connected to the ring gear of the compound planet gear arrangement is stably supported in the radial and axial directions.

A still further objet is to provide such a compound planet gear arrangement which allows that an in- or outgoing shaft which is connected to or forms a sun wheel of the compound planet gear arrangement is radially supported.

These and other objects are achieved by a compound planet gear arrangement as set out in the preamble of claim 1 and exhibiting the special technical features specified in the characterizing portion of claim 1. The compound planet gear comprises a ring gear, at least two planet gear units and a sun wheel. Each planet gear unit comprise a primary planet gear with primary planet teeth meshing with the ring gear and a secondary planet gear with secondary planet teeth meshing with the sun wheel. The secondary planet gear is axially connected with the primary planet gear. The diameter of the secondary planet gear is larger than the diameter of the primary planet gear. Each planet gear unit comprise a shock absorbing transmission arrangement which is arranged to allow a limited elastic rotation of the secondary planet teeth relative to the primary planet teeth.

The fact that the secondary planet gear has a larger diameter than the primary planet gear results in that the gear units per se constitute a gear step within the compound planetary gear arrangement. Thereby the compound planetary gear arrangement provides three gear steps. A first gear step corresponds to the difference in diameter between the ring gear and the primary planet gears. A second gear step corresponds to the difference in diameter between the primary planet gears and the secondary planet gears. A third gear step corresponds to the difference in diameter between the secondary gear steps and the sun wheel. By this means the compound gear arrangement may readily be designed with comparatively high total gear ratios. Additionally, such high total gear ratio may be accomplished in a space and weight saving manner. The additional second gear step also increases the degree of freedom when selecting a desired total gear ration for the entire compound gear arrangement.

The shock absorbing transmission arrangement further allows an elastic relative rotation between the primary planet gear and the secondary planet gear. By this means heavy rotational accelerations and retardation of one of the planetary gears is smoothly absorbed by the other planet gear, thereby preventing heavy impacts when one cog flank comes into contact with a corresponding cog flank of the meshing gear.

When used e.g. at windmill installations, winds with heavily varying forces and with turbulent flows causes the rotational speed of the rotor to vary momentarily. This in combination with the momentum of the gear arrangement and a generator connected thereto will continuously cause cog teeth of one gear to be forced into high frequently altering contact with neighbouring cog flanks of two cog teeth at a meshing gear. The inventive shock absorbing transmission arrangement efficiently reduces the impact of such altering contact and prevents heavy rotational accelerations and retardations on the input shaft to be transmitted to gears arranged downstream of the transmission unit.

In addition to the shock absorbing effect, the transmission units also greatly reduces the problems caused by over determination of split torque transmission in planetary gears. Since the secondary planet gears are limitedly and elastically rotational relative to their respective primary gear, each secondary gear may individually adjust its engagement with the sun wheel such that the total load of the gear arrangement is evenly distributed between all cooperating cog flanks momentarily being in engagement.

By this means, the compound planet gear and its constituent parts may be designed with comparatively small dimensions while still being able to withstand high and greatly momentarily varying torques. This in turn allows for that the compound planet gear may be designed with high energy density, high gear ration and high speed ration. The load distributing effect of elastic transmission arrangements also reduces the wear of all cog flanks involved in transferring torque through the compound planet gear, thereby greatly enhancing the service life of the entire arrangement.

The transmission arrangement may also be understood as a compliant gear, which is arranged to be used for shock absorbance, for reducing the required tolerances between meshing gears and splines and for reducing noise in such a way that the radial stiffness is not jeopardized even though the possible compliance functions in this transmission arrangement is comparatively much higher than in previously known compliant gears. The high compliance functions are well adapted to be used in compound stepped and stacked planetary gearboxes and will in e.g. a drive train consisting of two stepped and stacked compound gearboxes according to the present invention, due to the high speed ratio generate very high compliance characteristics between the input and output torque in the drive train. If these gear arrangements are used in windmills they will to a large extent smooth and even prevent the change in torque directions that often occurs between the turbine, rotor or propeller and the generator during e.g. turbulent winds.

It should be noted that satisfying shock absorbing properties of the transmission arrangement requires that the transmission arrangement is arranged to allow a certain minimum elastic relative rotation between the primary and secondary planet gears. This is necessary for the transmission arrangement to be able to reduce the retardations and accelerations caused by heavily fluctuating torques on the input axle. It has proven that the transmission arrangement should preferably be arranged to allow an elastic relative rotation of at least one degree and preferably between two and four degrees when the intended maximum torque for the compound planet gear arrangement is applied.

Each transmission arrangement may comprise a number of elastic members arranged to transmit torque between the first planet teeth and the second planet teeth.

Preferably the elastic members are arranged at the at the secondary planet gear which has a larger diameter than the primary planet gear. By this means it is possible to reduce the forces which need to be absorbed by the elastic members. Since the secondary planet gear has a larger diameter than the primary planet gear it is possible to arrange the elastic member at a longer distance from the rotational axis than if the elastic members were arranged at the primary planet gear or at a planet shaft axially connecting the primary and secondary planet gears. By increasing this distances any torque transmitted between the primary and secondary planet gear will result in a correspondingly reduced force acting on the elastic members. This allows for a higher degree of freedom when choosing the material properties of the elastic members and reduces the space requirements as well as prolongs the service life of the elastic members.

Each transmission arrangement may comprise a drive disc which is fixed to a planet shaft connecting the primary planet gear with the secondary planet gear and which is provided with a number of axially extending pins fixed to the drive disc; and a cog wheel member provided with peripheral teeth and comprising a transmission disc provided with a number of openings corresponding to the number of pins, wherein an annular elastic member is received in each opening and a respective pin is received in each elastic member.

In such case the peripheral teeth of the cog wheel member may form the secondary planet teeth and the drive disc may be non-rotationally fixed to the primary planet gear by means of a planet shaft.

Advantageously, the planet gear unit may, together with bearings form a planet gear module. Such a module may readily be mounted and de-mounted as a single component.

The planet gear module may further comprise at least one bearing hub for fixation of a bearing to a main body or housing of the compound planet gear arrangement.

Each elastic member may comprise an annular rubber bushing.

Each elastic member may further comprise an inner metallic sleeve and an outer metallic sleeve.

The compound planet gear arrangement may be a stacked planet gear arrangement comprising an even number of planet gear units with the primary planet gears arranged in a first radial plane and wherein half of the secondary planet gears are arranged in a second radial plane and half of the secondary planet gears are arranged in a third radial plane being arranged at a greater distance from the first radial plane than the second radial plane.

In cases where the compound planet gear arrangement is not stacked, it may comprise an even or uneven number or planet gear units.

The transmission arrangements may be arranged to allow the limited elastic rotation equally in both rotational directions. By this means, the compound planet gear arrangement will be able to absorb heavy fluctuations of the torque applied to the incoming shaft and of the load applied to an outgoing shaft equally well when the compound planet gear is driven in both rotational directions. Additionally, the compound planet gear arrangement will be able to absorb heavy retardations and accelerations equally well when driven in either rotational direction.

The elastic members may be non-preloaded or equally preloaded in both rotational directions. This applies particularly to each the elastic members of a single planet gear unit when seen alone. When several planet gear units are mounted to form the compound planet gear arrangement it may at some applications such as precise positioning be desirable to create a certain overall preload between cog flanks acting in opposite rotational directions. It is then possible during mounting to angularly adjust the different planet gear units, such that the elastic members of half of the number of the planet gear units are somewhat preloaded in one rotational direction while the elastic members of the remaining half of the planet gear units are equally preloaded in the other rotational direction. Such overall preload of the compound planet gear arrangement should however be kept comparatively low since such preload will compress the elastic members and thereby reduce their shock absorbing capability to a corresponding degree. It should also be noted that any such overall preload of the compound planet gear arrangement will increase the load on the cog flanks. Thereby it is necessary either to reduce the maximum torque that can be transmitted by the compound planet gear arrangement or to increase the dimensions of the participating gears and bearings or alternatively to increase the load bearing capability of the cog flanks.

The invention further concerns a drive train arrangement comprising a first compound planet gear arrangement as described above forming a first gear step and a second compound gear arrangement as described above forming a second gear step of the gear arrangement.

The sun wheel of the first compound planet gear arrangement may then be connected to the ring gear of the second compound gear arrangement.

The sun wheel of the second compound planet gear arrangement may further be connected to a rotor of an electrical generator, a motor or another utility appliance.

Alternatively, the drive train arrangement may comprise more than two compound planet gear steps, wherein the last gear step comprises a sun wheel which is connected to a generator, a motor or another utility appliance.

By connecting a generator, a motor or another utility to the sun wheel or alternatively by means of the sun wheel, which may corm part of the utility, results in that the shaft of the utility being connected to or comprising the sun wheel will be radially supported in multiple directions by the secondary planet gears meshing with the sun wheel. For example at a compound planet gear comprising three planet gear units the sun wheel will be radially supported in three directions. Correspondingly, at a stacked compound planet gear arrangement comprising six or eight planet gear units the sun wheel is supported in a corresponding number of radial directions. This provides a great advantages in that it reduces the radial load on the connected utility and is particularly advantageous at high speed applications. Especially, such radial support greatly enhances the service life of the utility and any additional bearings comprised in the utility.

The drive train arrangement may comprise a housing which is divided into at least a first compartment receiving the first compound gear arrangement and a second compartment receiving the second compound gear arrangement, wherein the compartments are sealed from each other, for allowing different lubrication media to serve the respective compartments.

At least one of the first and second compartments may be divided into at least two sub-compartments.

The drive train arrangement may further comprise an input shaft which comprises a first tubular shaft member which is connected to the ring gear of the first compound gear arrangement and a second tubular shaft member which is arranged co-axially around the first tubular shaft member and fixed to the first tubular shaft member by means of an annular mounting disc, wherein the second tubular shaft member is journaled in bearings to the housing of the drive train arrangement.

The first tubular shaft member may be comparatively weak and arranged mainly to transmit torque from the mounting disc to the ring gear of the first compound gear arrangement and the second tubular shaft member may, together with the housing, be arranged to absorb axial, radial and bending forces from the mounting disc.

This provides great advantages in that an input or output shaft connected to the drive disc will be stably supported in the radial and axial directions merely by being connected to the drive train arrangement. By this means the need of arranging additional bearings or other support structures outside of the drive train arrangement is reduced, which in turn reduces the space requirements and costs when utilising the drive train at various applications. For instance, the axial and radial space requirements may be greatly reduced when utilizing the drive train arrangement or a compound planet gear arrangement at wind mills or direct drive transmissions of electrical cars.

The arrangement of a tubular or hollow shaft further allows for that the interior space this shaft may be utilized to accommodate portions of the external utility connected to the shaft, such as couplings and the like. This also contributes to reduce the space requirements of the total installation.

A turbine, such as a wind turbine, may be fixed to the mounting disc.

In the drive train arrangement, the first compound planet gear arrangement, the second compound planet gear arrangement and, when applicable, the generator and the input shaft may be arranged as separate modules which are arranged to be modularly assembled and de-assembled, module per module.

The drive train arrangement may comprise control means such as electrical wires and/or pipes for conducting controlling fluids, for controlling a turbine mounted to the mounting disc which control means extends from the first gear step or another gear step which is not the last gear step, axially through the first tubular shaft member of the input shaft to the mounting disc.

Further objects and advantages of the compound planet gear and the gear arrangement appear from the following detailed description of embodiments and from the appended claims.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 1b is an exploded perspective view of the drive train shown in FIG. 1a.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
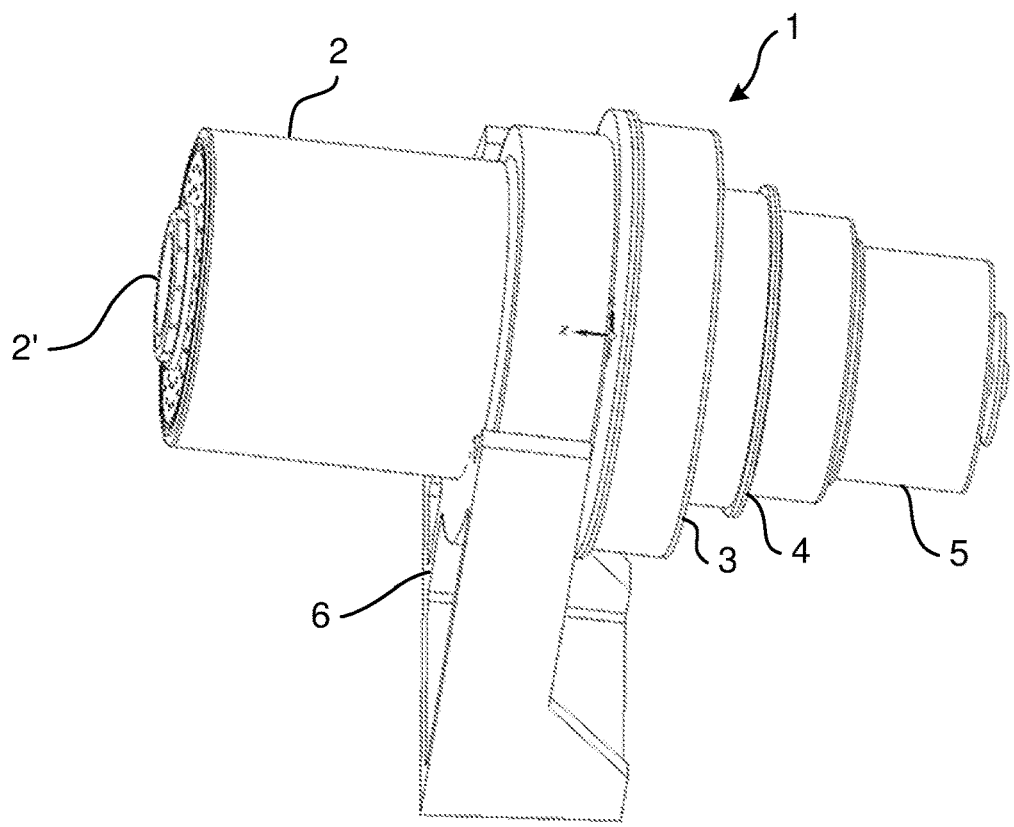
FIG. 1a is a perspective view illustrating a drive train for a wind mill, which drive train comprises a gear arrangement according to an embodiment of the invention.
Figure 1B:
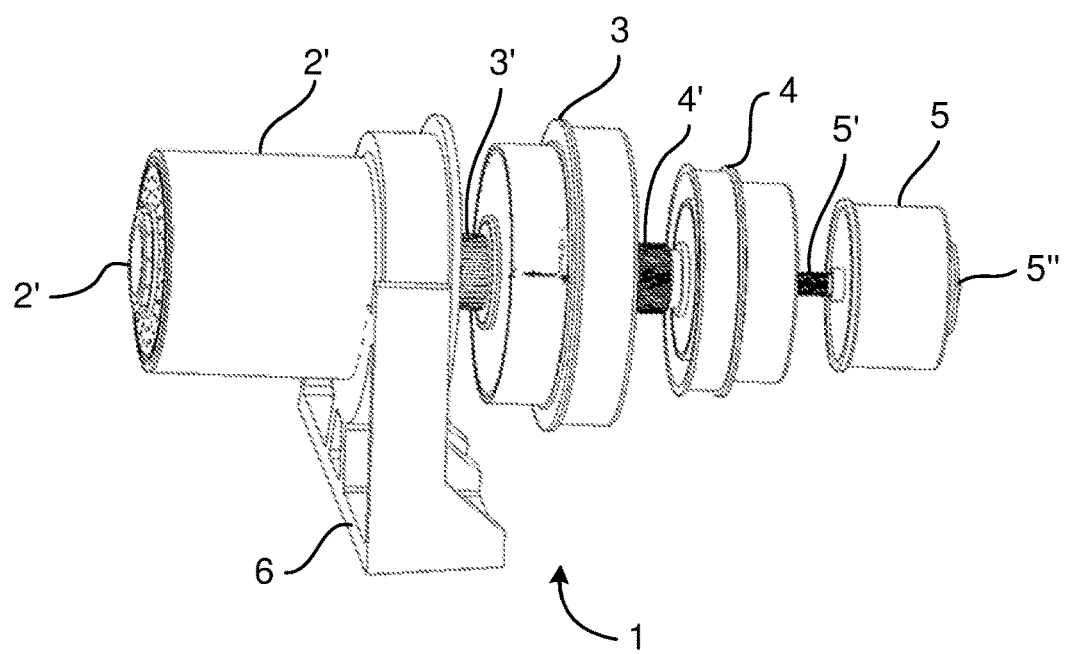

FIGS. 1a and 1b illustrates a modular drive train arrangement 1 for a wind mill. The drive train 1 comprises an input module 2, a first gear step module 3 being an eight stepped and stacked compound planet gear arrangement and a second gear step module 4 being a six stepped and stacked compound planet gear arrangement and finally a generator module 5. The input module 2 is fixed to a base frame 6, which may be fixed to the nacelle (not shown) of a wind mill (not shown). The drive train exhibits a longitudinal axis extending centrally from the input module 2 to the generator module 5. The input module 2 comprises a mounting disc 2' which is rotational about the longitudinal axis and arranged for allowing fixation of radially extending wind turbine blades (not shown).

The first gear step module 3 comprises a splined shaft 3' which is inserted into a hollow input shaft (not shown) with corresponding splines (not shown) of the input module 2. The input shaft is connected to the mounting disc 2' for transmitting rotational movement and torque from the turbine to the first module 3. The second gear step module 4 comprises an input gear 4', which is inserted into the first gear step module 3, when mounted. As will be explained more in detail below, the input gear 4' of the second gear step module 4 forms an output sun wheel of the first gear step module 3.

The generator module 5 is provided with a generator input gear 5' that in the same manner is inserted into the second gear step module 4 and there forms the sun wheel of the second gear step module. The generator module 5 is further provided with a brake disc 5" which is fixed relative a rotor (not shown) of the generator module 5, which in turn is connected to the generator input gear 5'. By applying a braking force to the breaking disc 5", e.g. by means a clamping friction device (not shown) it is thus possible to slow down the rotation of the generator rotor, the entire drive train 1 and the wind turbine.

This modular arrangement of the entire drive train arrangement 1 affords for great advantages with regard to assembly, de-assembly and maintenance of the drive train. The arrangement allowing axial insertion and removal of the different modules into and out of each other greatly reduces the space needed for servicing, repairing and replacing the modules. Thereby the interior space of the nacelle housing the gear train may be kept at a minimum.

Figure 2:
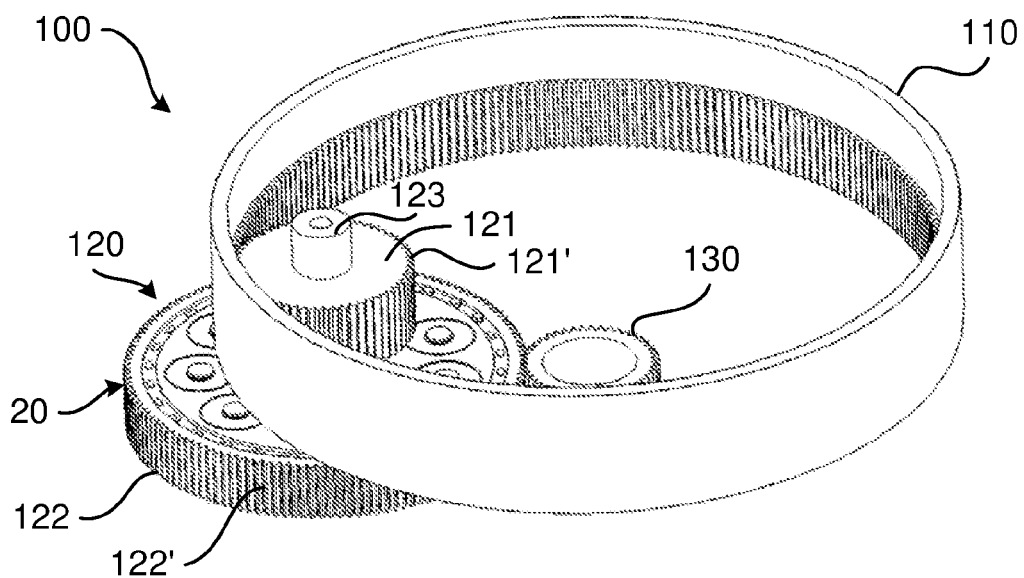
FIG. 2 is a schematic perspective view of a simplified compound planet gear according to one embodiment of the invention.

FIG. 2 illustrates, in a schematic and simplified manner, the general concept of a compound planet gear, according to one embodiment, which may be used in either of or both gear modules 3, 4 shown in FIGS. 1a and 1b.

The compound planet gear 100 illustrated in FIG. 2 comprises a single ring gear 110, a number of planet gear units 120 and a single sun wheel 130. For reasons of clarity, only one planet gear unit is shown in FIG. 2 but it is realized that the compound planet gear 100 should comprise at least two planet gear units for achieving the desired distribution of the load to several pairs of gear flanks being simultaneously in engagement, when transmitting a torque from the ring gear 110 to the sun wheel 130. In embodiments comprising a non-stacked compound planet gear, the number of planet gear units is typically three or four. In stacked compound planet gears the number of planet gear units may be doubled, thus typically resulting in six or eight planet gear units. The load to be sustained by each gear flank of the ring gear, the planet gear units and the sun wheel is thus reduced to the total load divided by the number of planet gear units.

As seen in FIG. 2, the planet gear units 120 each comprise a primary planet gear 121 having primary teeth 121' meshing with the ring gear 110 and a secondary planet gear 122 which is connected axially to the primary planet gear 121.

The secondary planet gear 122 is provided with secondary teeth 122' which meshes with the sun wheel. According to the invention, the planet gear units further comprises a shock absorbing transmission arrangement which allows the secondary teeth 122' to preform a limited elastic rotation relative to the primary teeth 121'.

Figure 3:
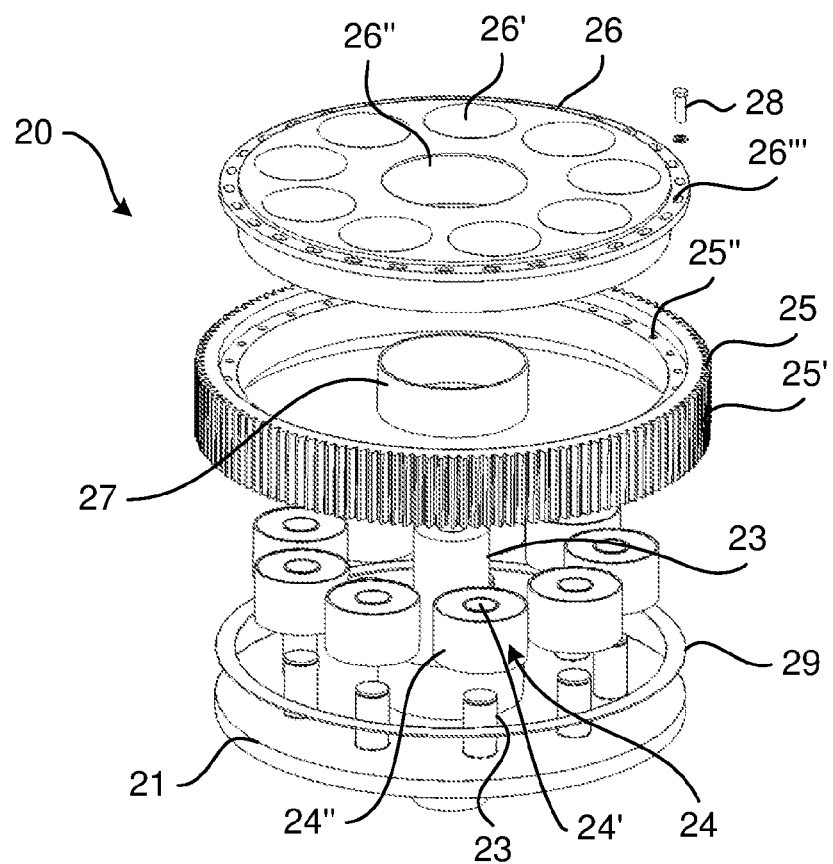
FIG. 3 is an exploded perspective view of an example of a shock absorbing planet unit, which may be used in a compound planet gear according to the invention.

FIG. 3 illustrates an example of how such a shock absorbing transmission unit may be arranged. According the example shown in FIG. 3 the transmission unit 20 comprises a circular drive disc 21 which is non-rotationally fixed to a planet shaft 22. The planet shaft 22 is provided with splines (not shown) such that the drive disc 21 and a primary planet gear (not shown in FIG. 3) may be non-rotationally fixed to the planet shaft 22.

The drive disc 21 is provided with a number of cylindrical pins 23 which are fixed to the drive disc 21 and extend in parallel with the planet shaft 22. The pins 23 are evenly distributed in the circumferential direction and in the shown example, nine such pins 23 are arranged on the drive disc 21. Each pin 23 is received in a respective elastic member 24. The elastic members 24 comprise an elastic and resilient material, such as natural or synthetic rubber. The elastic and resilient material of each elastic member is formed as a cylindrical sleeve, having a cylindrical envelope surface and an axially and centrally extending cylindrical bore. The elastic members further comprise an inner cylindrical metal sleeve 24' received in the cylindrical bore and an outer cylindrical metal sleeve 24" surrounding the envelope surface of the elastic and resilient material sleeve. The inner 24' and/or outer 24" metallic sleeves are preferably fitted to the elastic and resilient material by press fitting such that the elastic and resilient material is compressed and thereby pretensioned or preloaded when mounted. It should be noted that such symmetrical radial preload of the cylindrical elastic members 24 will result in that the elastic members are equally preloaded in both rotational directions of the planter gear unit in which they are comprised. By selecting the number of elastic members 24, the dimensions and properties of the elastic and resilient material and the degree of compression, it is possible to adjust the ratio between applied torque and degree of allowed relative rotation between the primary and secondary teeth.

The transmission unit 20 further comprises an annular cog wheel member 25 with peripheral teeth 25' and a circular transmission disc 26 with a number of cylindrical through openings 26' and a central cylindrical bore 26" for receiving the planet shaft 22. The number and positioning of the through openings 26' correspond to the number and positioning of the pins 23. The trough openings 26' are further dimensioned such that the elastic members 24 may be received therein with a tight fit. An annular slide bearing 29 is arranged between the drive disc 21 and the annular cog wheel member 25 for allowing relative rotation there between.

The annular cog wheel member 25 and the transmission disc 26 are provided with a plurality of mutually corresponding mounting holes 25", 26''' for the reception of mounting bolts 28. The mounting holes 26''' of the transmission disc 26 are elongate in the peripheral direction of the transmission disc 26, such that the relative angular position between the annular cog wheel member 25 and the transmission disc 26 may be adjusted before tightening the mounting bolts 28. This is an important feature since it allows the relative angular position between the primary planet gear 21 fixed to the planet shaft 23 and the annular cog wheel member 25, i.e. between the primary and secondary planet teeth to be adjusted when mounted. During installation of the entire gear arrangement such a nominal angular adjustment may be carried out for all transmission units comprised in the drive train, such that all drive train cog flanks simultaneously in engagement may experience equal nominal load.

The transmission unit 20 also comprises a central bearing 27 which is arranged coaxially around the planet shaft 22 between the drive disc 21 and the transmission disc 26. The bearing 27 may be a slide bearing or a roller bearing which allows small rotational relative movements between the drive disc 21 and the transmission disc 26.

In the above described embodiment of the shock absorbing transmission unit 20, the elastic members 24 are formed of standard bushings which are commercially available. The limited elastic relative rotation between the primary planet teeth and the secondary planet teeth may however also be accomplished in many other ways. E.g. the drive disc may be provided with axially protruding and radially extending support members which form opposing first support surfaces facing generally in the circumferential direction of the drive disc. The transmission disc may comprise corresponding second support surfaces facing a respective first support surface. A resilient member, such as compression spring, a leaf spring, or a resilient bussing may be arranged between each pair of opposing first and second support surface, such as to allow the transmission disc and annular cog wheel member to be limitedly and resiliently rotated relative to the drive disc and the primary gear.

With the different embodiments of the shock absorbing transmission units comprised in the planet gear units it is possible to choose the ratio between the applied torque and the maximum relative rotation. It may e.g. be suitable to design the transmission unit such that the relative rotation between the primary planet teeth and the secondary planet teeth is approx. 2-4° at maximum torque. However, also other torque to relative rotation ratios may be used.

Figure 4:
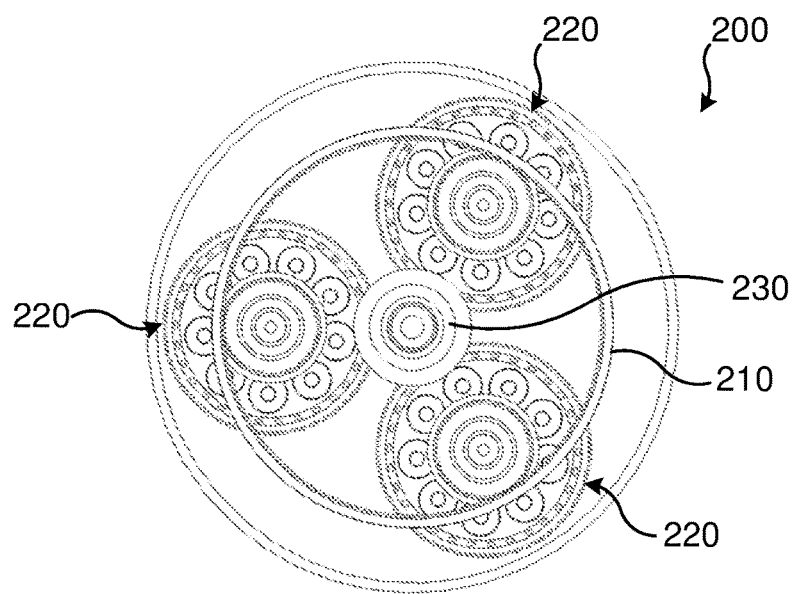
FIG. 4 is a schematic and simplified top view of a three stepped compound planet gear arrangement according to the invention.
Figure 5:
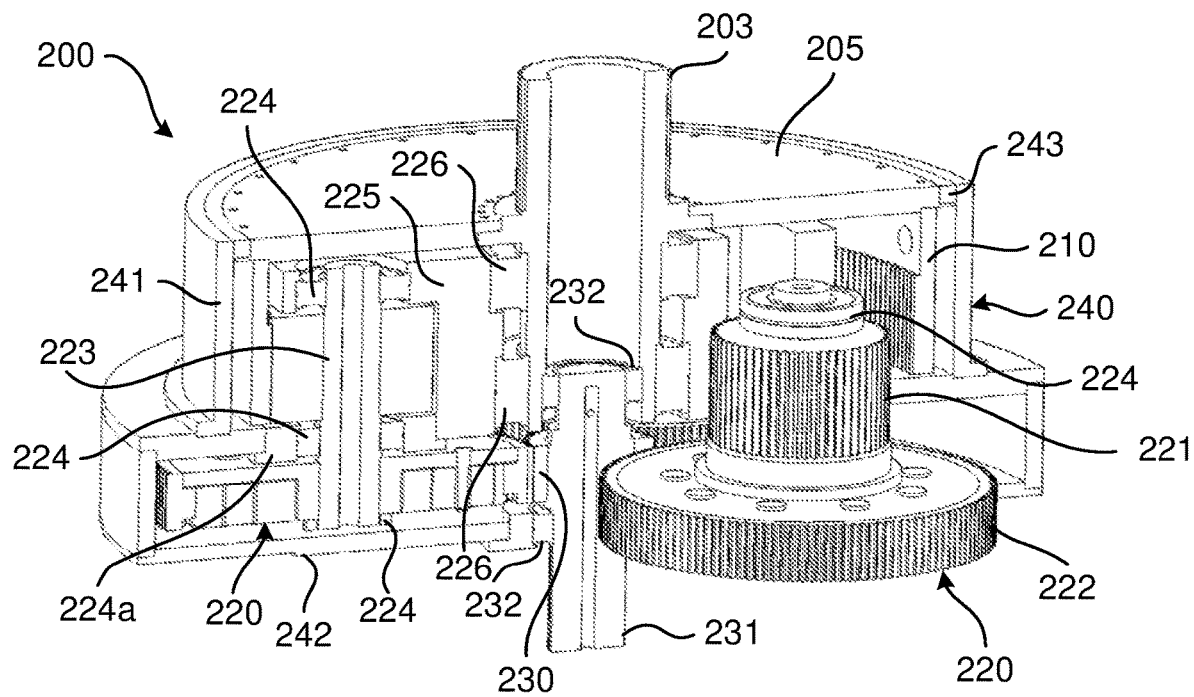
FIG. 5 is a more complete semi section in perspective of the three stepped compound planet gear arrangement shown in FIG. 4.

FIGS. 4 and 5 illustrate an exemplifying non-stacked compound planet gear 200 according to the invention. Such a planet gear may be used as a single step, a first step, a second step or any additional step gear in a gear arrangement. In the shown example the compound planet gear 200 is illustrated for use as e.g. a single stepped planetary gear or adapted as a first gear module for a drive train.

The compound planet gear 200 comprises a splined input shaft 203. The input shaft 203 is fixed to and extends through a ring wheel carrying disc 205 which in turn is fixed to a ring wheel 210. Three shock absorbing planet gear units 220 are arranged in meshing contact with the ring wheel 210 and a sun wheel 230. The shock absorbing planet gear units 220 are constructed as the planet gear unit 120 described above with reference to FIGS. 2 and 3 and are not further described in detail here.

The planet shafts 223 of the planet gear units 220 are journaled in bearings 224 to a planet carrier 225 which forms a stationary part. Also the input shaft 203 is journaled in bearings 226 to the planet carrier 225. The primary planet gear 221 of each planet gear unit 220 is meshing with the ring wheel 210 and the secondary planet gears 222 are meshing with the sun wheel 230. The sun wheel 230 is fixed to a first step output shaft 231 which is journaled in bearings 232 inside the hollow input shaft 203.

Each shock absorbing planet gear unit 220 forms, together with bearings 224 and a bearing hub 224a a shock absorbing planet gear module. The bearing hub 224a forms an annular mounting member by which the outer circumference of a bearing 224 may be fixed to the planet carrier. The bearing hub 224a has a larger diameter than the primary planet gear 221 such that a remaining mounting hole in the planet carrier 225, when the bearing 224 and bearing hub 224a are removed, has a diameter which is larger than the diameter of the primary planet gear 221. By this means the planet gear module comprising the planet gear unit 220, its bearings 224 and the bearing hub 224a may be mounted and dismounted as a single composite component axially from below. The planet gear module further comprises at least one spline arrangement for facilitating assembly, de-assembly and maintenance. In case that the bearing 224 has a larger diameter than the primary planet gear 221 the bearing hub 224a can replaced by means of another fixture of the bearing 224 to the planet carrier 225, which fixture is a part of the main body forming a housing of the gearbox construction. At such cases the shock absorbing planet gear unit and the bearings alone form a plane gear module, which may readily be mounted and dismounted as a single composite component.

The compound planet gear further comprises a housing 240 comprising side walls 241 and a bottom wall 242. The housing 240 forms a stationary part which is formed integral with or fixed relative to the planet carrier 225. The housing 240, together with the ring wheel carrying disc 205 with slide bearings 243 and the output shaft 231 with bearings 232, sealingly encloses and interior space. By this means, the compound planet gear 200 with housing 240 forms a module. The housing 240 may thus contain a lubrication media, such as oil, which is encased in the module and which may thus be different from the lubrication media used in the other parts and modules of the entire drive train arrangement. The first module may also be readily mounted to and from an input module of the drive train arrangement by axial insertion and withdrawal.

Figure 6:
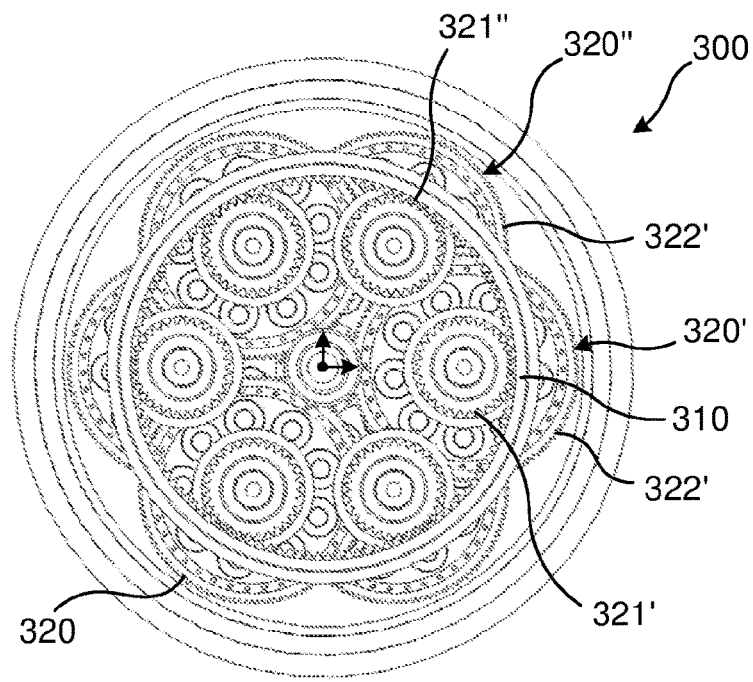
FIG. 6 is a schematic and simplified top view of a six stepped compound planet gear arrangement according to the invention.
Figure 7:
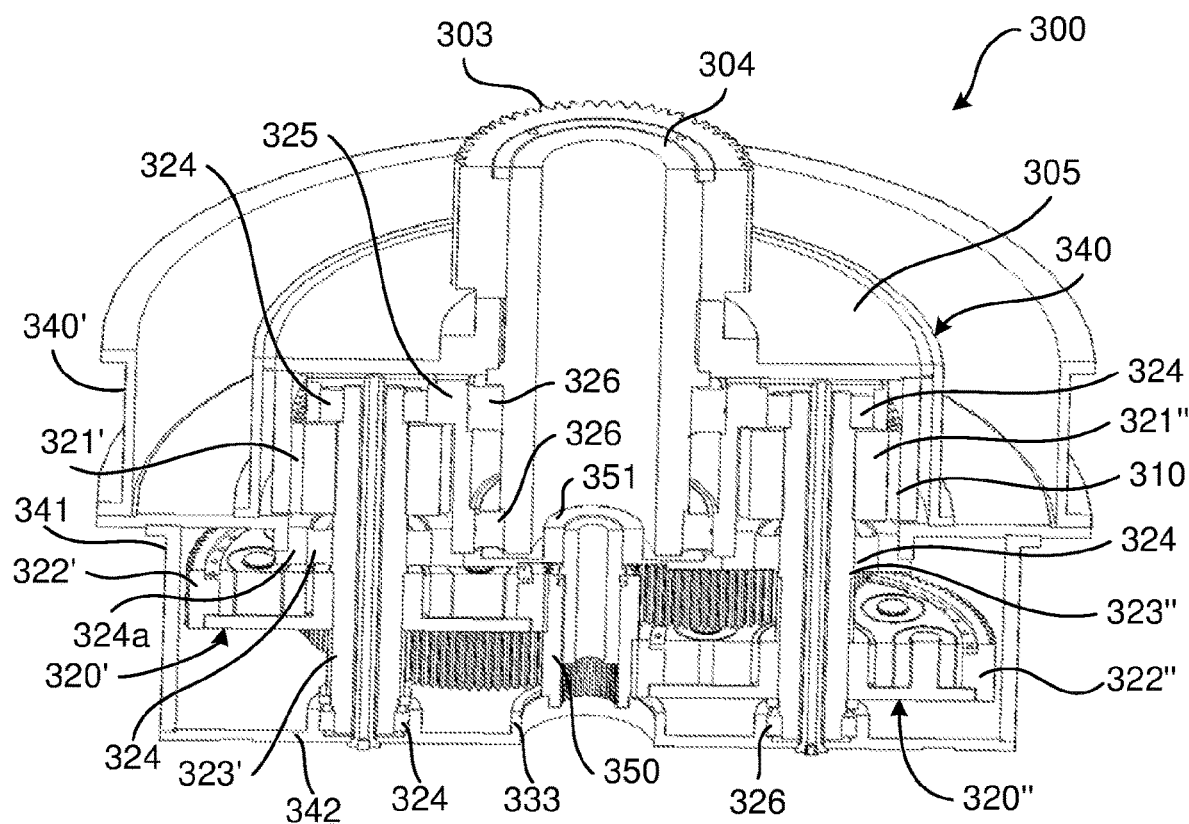
FIG. 7 is a more complete semi section in perspective of the six stepped compound planet gear arrangement shown in FIG. 6.

FIGS. 6 and 7 illustrate a six stepped and stacked compound planet gear arrangement 300 according to the invention. Such a stacked planet gear arrangement may be used as a single first gear step module or a second gear step module as shown in FIG. 1b or in other gear arrangements. In the shown example the stacked compound planet gear 300 is illustrated for use as a second gear step. The stacked compound gear 300 thus corresponds to gear module 4 shown in FIGS. 1a and 1b.

The six stepped and stacked compound planet gear 300 comprises an input gear 303 mounted on a hollow input shaft 304. As described above, that input gear corresponds to the sun wheel of the first gear module 3 in the drive train 1 shown in FIGS. 1a and 1b. The input shaft 304 is fixed to and extends through a ring wheel carrying disc 305 which in turn is fixed to a ring wheel 310. The input shaft 304 is journaled in strong bearings 326 to a planet carrier 325. Six shock absorbing planet gear units 320 are arranged in meshing contact with the ring wheel 310 and a sun wheel 330. The planet gear units 320 are generally constructed as the planet gear unit described above with reference to FIGS. 2 and 3. However, at the stacked compound planet gear 300 shown in FIGS. 6 and 7, the set of planet gear units 320 comprises three first planet gear units 320' and three second planet gear units 320'. The planet shafts 323' 323" of the first 320' and second 320" planet gear units are equally long and longer than the planet shafts 220 shown in FIGS. 3 and 4. The first 320' and second 320" planet gear units differ only in that the secondary planet gears 322" of the second gear units 320" are arranged at a radial plane which is arranged at a greater distance from the primary gears 321', 321" than the radial plane at which the secondary planet gears 322' of the first gear units 320' are arranged.

The planet shafts 323', 323" of the planet gear units 320', 320" are journaled in bearings 324 to the planet carrier 325. The primary planet gears 321', 321" of each planet gear unit 220', 320" is meshing with the ring wheel 310. At the arrangement shown in FIG. 7, an auxiliary centring shaft 350 has been installed. The auxiliary centring shaft 350 is supported by an annular flange forming a centring device 351. The input shaft 304 extends to, without coming into contact with, the centring device 351. The envelope surface of the centring shaft 350 forms a sun wheel and the secondary planet gears 322', 322" are meshing with the sun wheel of the centring shaft, at different axial planes. Such an auxiliary centring shaft 350 may be used as a temporary aiding means for mounting and nominal adjustment of the shock absorbing planet units 320', 320".

As in the embodiment shown in FIG. 5, do the planet gear units 320', 320" together with bearings 324 and bearing hub 324a form a planet gear module.

The six stepped and stacked compound planet gear 300 further comprises a housing 340 comprising side walls 241 and a bottom wall 342 provided with a central opening. The housing 340 forms a flange unit 340' for connecting the gear step modules to each other.

Figure 8:
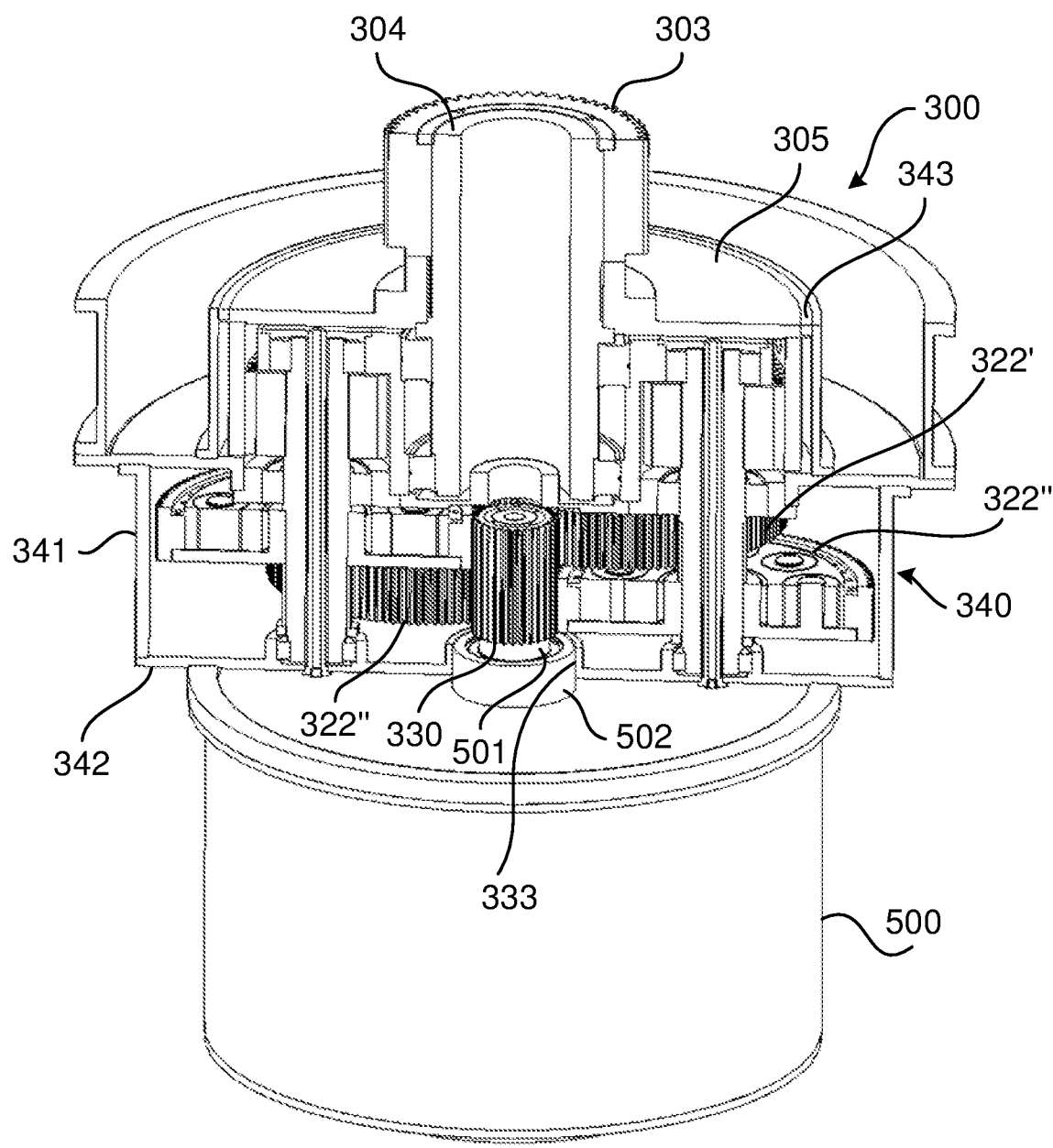
FIG. 8 is a semi section in perspective of a six stepped and stacked compound planet gear arrangement when mounted to a generator module.

FIG. 8 shows the six stepped and stacked compound planet gear arrangement 300 as being the second gear step module in the drive train 1 in FIGS. 1a and 1b, when a generator module 500 or 5 has been mounted thereto. As seen in FIG. 8, the auxiliary centring shaft 350 shown in FIG. 7 has been removed and an input shaft 501 of the generator module 500 has been inserted through a central flanged opening 333. The generator's input shaft 501 is steadily supported by bearings arranged at both ends of the shaft and is at the protruding end provided with external teeth forming a sun wheel 330. When mounted, the sun wheel 330 meshes with the secondary planet gears 322', 322". The generator module 500 further comprises an annular flange 502 which is received in the flanged opening 333 arranged in the bottom wall 342. By this means, the housing 340, together with the ring wheel carrying disc 305 with slide bearings 343, the bottom wall 342 and the generator shaft 501 and flange 502, sealingly encloses and interior space. The stacked compound planet gear 300 with housing 340 thus forms a second gear step module corresponding to the second gear step module 4 shown in FIG. 1b. The housing 340 may contain a lubrication media, such as oil, which is encased in the module and which may thus be different from the lubrication media used in the other parts and modules of the entire drive train arrangement. The second gear step module may also be readily mounted to and from the first gear step module of the drive train arrangement by axial insertion and withdrawal. Correspondingly the generator module 500 comprising a generator input gear which is constituted by the sun wheel 330 may be readily be mounted to and from the second gear step module after removal of the auxiliary centring shaft 350, once it has been used for the assembly and adaption of the shock absorbing units 320. The generator module may thus readily be mounted to and removed from the second gear step module by axial insertion and withdrawal through the hole in the bottom wall 342.

Figure 9:
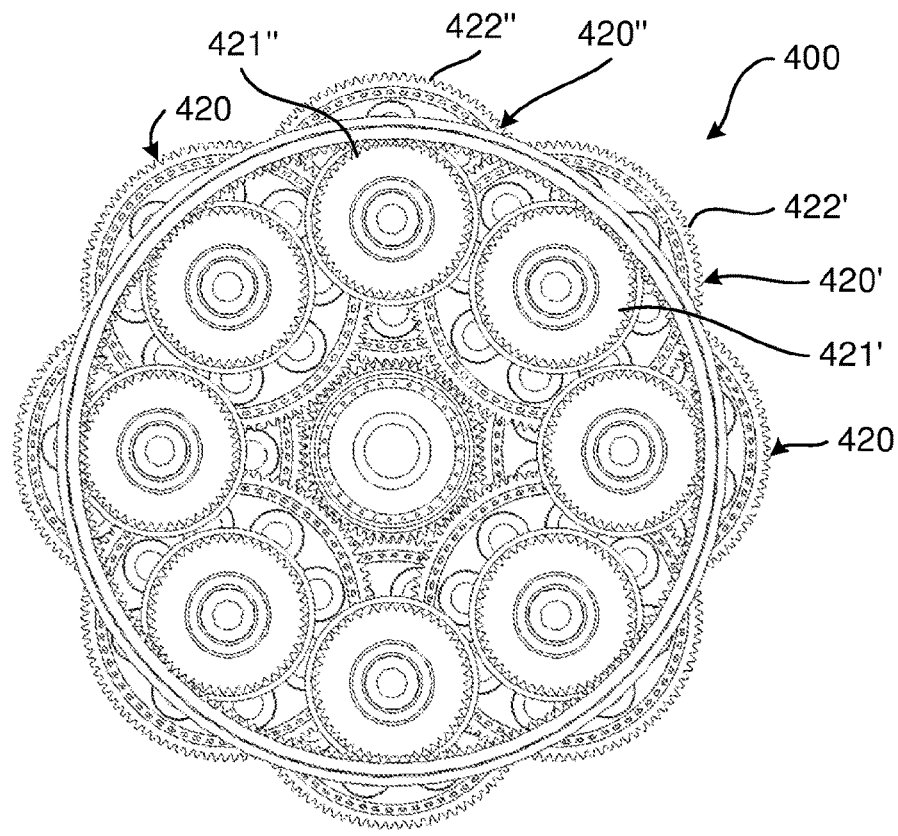
FIG. 9 is a schematic and simplified top view of an eight stepped and stacked compound planet gear arrangement according to the invention.
Figure 10:
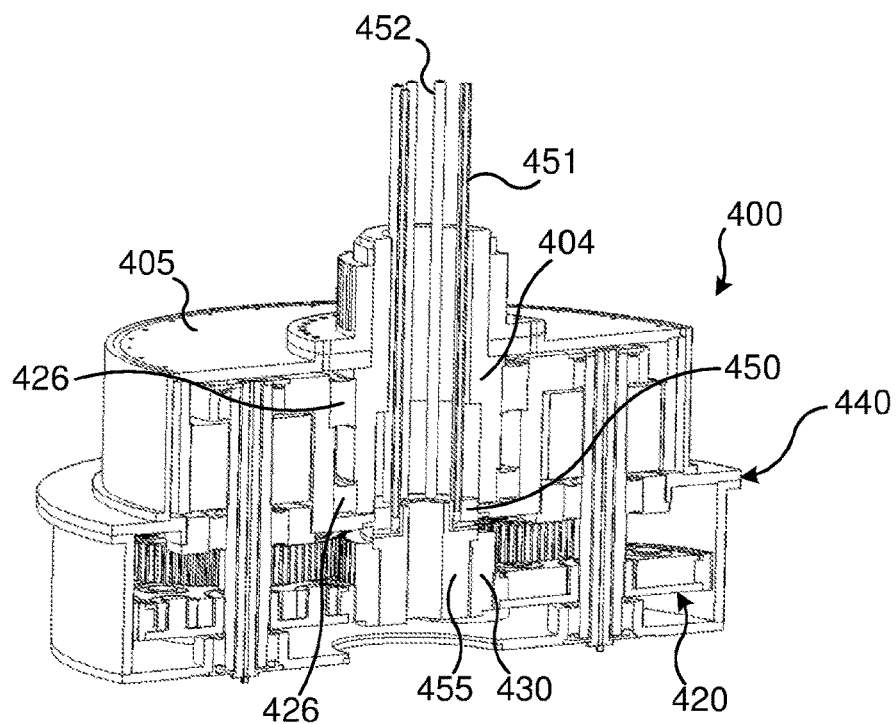
FIG. 10 is a more complete semi section in perspective of the eight stepped and stacked compound planet gear arrangement shown in FIG. 9.

FIGS. 9 and 10 illustrate an eight stepped and stacked compound planet gear arrangement 400 that represent the first gear module in the drive train 1 in FIGS. 1a and 1b. This stacked compound planet gear 400 is similar to stacked compound planet gear 300 shown in FIGS. 6 and 7. However, the planet gear 400 differs from planet gear 300 in that it comprises eight shock absorbing planet units 420. The set of planet units 420 comprises four first planet units 420' and four second planet units 420". Just as at planet units 320 shown in FIGS. 6 and 7, the secondary planet gears 422″ of the second planet units 420″ are arranged at a greater axial distance from the primary gears 421′, 421″ than the secondary planet gears 422′ of the first planet units 420′.

As seen in FIG. 10 the stacked compound planet gear 400 comprises an input shaft 404 which is fixed to and extends through a driving ring wheel carrying disc 405. The input shaft 404 is journaled in strong bearings 426. The input shaft 404 extends axially towards, but does not contact a centring unit 450 which is rigidly fixed to the housing 440. The centring unit 450 comprises a number of through holes receiving control means such as electrical wires 451 and pipes 452 which extend into and axially through the hollow input shaft 404. The electrical wires 451 and the pipes 452 are connected with regulating devices arranged at the hub of a wind turbine (not shown). By this means regulating signals and hydraulic fluids may be conducted from the first gear step of the entire drive train arrangement to the wind turbine for regulating the different functions, e.g. the pitch of the wind turbine. An important advantage of such an arrangement comprising a centring unit 450 arranged at the first gear step and a hollow input shaft 404 is that all pipes and wires needed for controlling the turbine extend from the turbine only to the first step of the gear arrangement. Thereby there is no need for extending the pipes and wires further down stream the gear arrangement. I.e. it is not necessary to arrange pipes or wires through the second gear step, through any possible further gear step or through the generator. By this means, essentially no further through holes or openings are required in the central axle of the drive train, downstream of the first gear step. This in turn makes it possible to reduce the diameters of the sun wheels thereby to achieve great gear ratios by utilising merely two stacked compound planet gear arrangements arranged in a first and second gear step respectively.

The centring unit 450 further functions as a support for a centring shaft 455 carrying an adjustment sun wheel 430, which may be used when mounting and adjusting the nominal load of the shock absorbing planet units 420.

Figure 17:
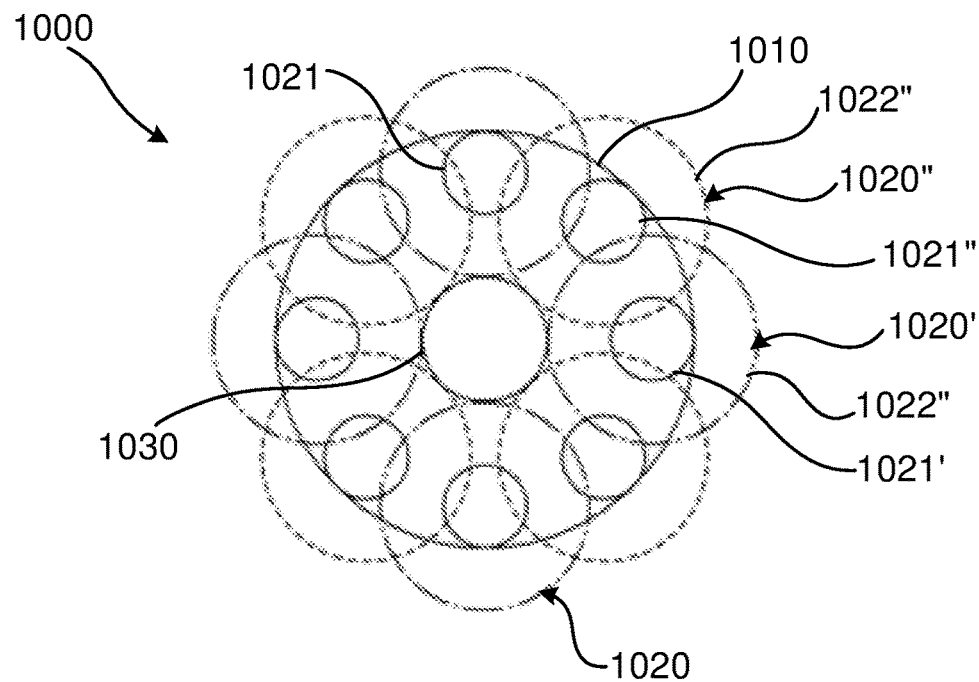
FIGS. 17 and 18 are schematic simplified top views of an eight stepped and stacked compound planet gear arrangement according to respective alternative embodiments of the invention.
Figure 18:
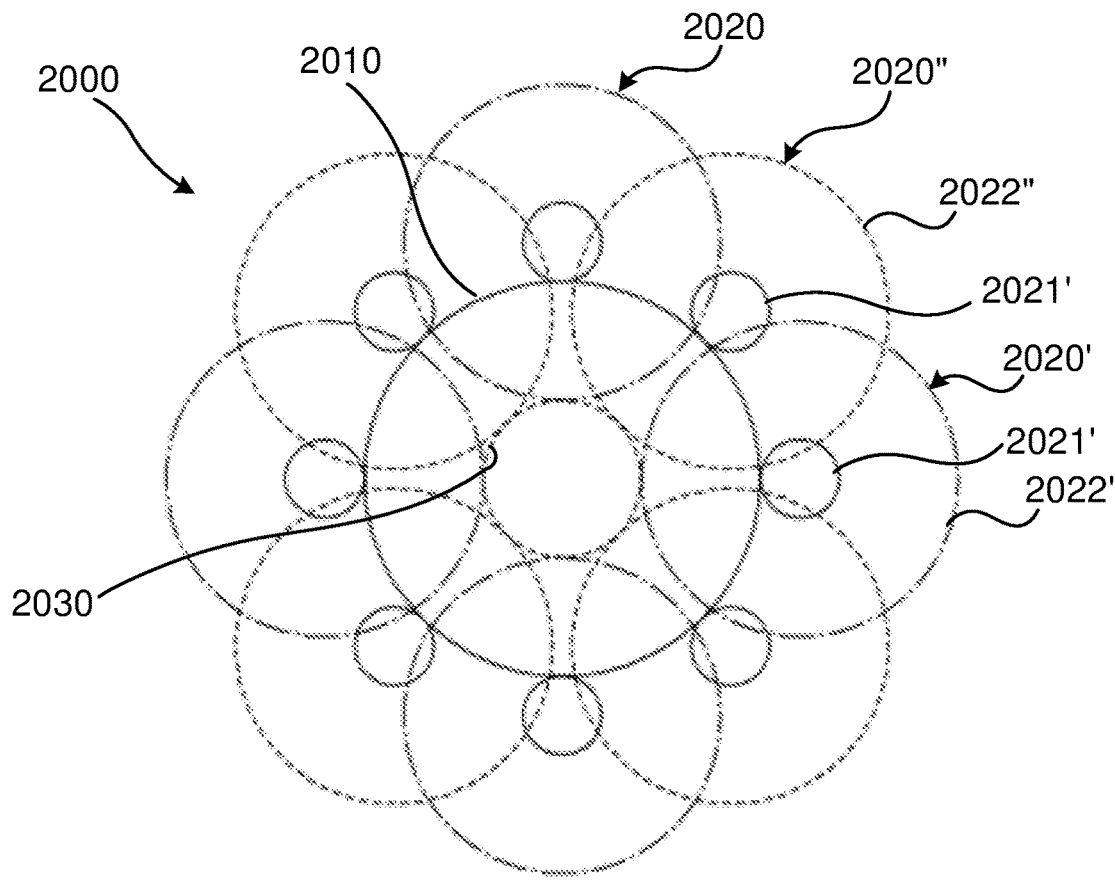

At the above described embodiments of the compound planet gear arrangement, the ring gear is arranged with internal teeth meshing with the primary teeth. It is however also possible that the ring gear is arranged with external teeth meshing with the primary teeth on the primary planet gears. FIGS. 17 and 18 respectively schematically illustrate these two different configurations. The compound planet gear arrangement 1000 shown in FIG. 17, is a stacked compound planed gear arrangement comprising eight planet gear units 1020. The eight planet gear units 1020 are dived into a group of four gear units 1020′ having secondary gears 1022′ arranged at one axial level and another group of four gear units 1020″ having secondary planet gears 1022″ arranged at a different axial level. All secondary planet gears 1022′, 1022″ meshes with a common sun wheel 1030 provided with external teeth. Each secondary planet gear 1022′, 1022″ is axially connected to a respective primary planet gear 1021′, 1021″, all primary planet gears being arranged essentially at the same axial level. A ring gear 1010 provided with internal teeth (not shown) meshes with external primary teeth (not shown) arranged on the primary planet gears 1021′, 1021″. This embodiment thus fully corresponds to the embodiment shown in FIG. 9.

At the alternative embodiment shown in FIG. 18 the gear arrangement also is a compound stacked planetary gear arrangement 2000 comprising eight planet gear units 2020 divided into four planet gear units 2020′ with secondary planet gears 2022′ arranged at one axial level and four planet gear units 2020″ with secondary planet gears 2022″ arranged at a different axial level. All secondary planet gears 2022′, 2022″ are axially connected to a respective primary planet gear 2021′, 2021″ which are all arranged essentially on the same axial level. At this embodiment however, external primary teeth (not shown) of the primary gears 2021′, 2021″ meshes with external teeth (not shown) arranged on a ring gear 2020.

Such compound planets gear arrangement comprising ring gears 2010 with external teeth meshing with the primary teeth may at some applications exhibit some advantages when compared compound to planet gear arrangements comprising ring gears with internal teeth. E.g. they may, with the same ring gear diameter, exhibit a somewhat higher gear ratio. Additionally, in use the load applied to bearings arranged axially between the primary planet gears 2021′, 2021″ and the secondary planet gear 2022′, 2022″ may be reduced. Compound planet gear arrangements of the type illustrated in FIG. 18 may therefor find use e.g. at some applications where comparatively small torques are to be transmitted by the compound planet gear arrangement.

However in comparison to compound planet gear arrangement comprising ring gears with internal teeth, the type with external teeth also exhibit a number of general disadvantages. E.g. they require the secondary planet gears 2022′, 2022″ to have larger diameters. Also the total dimension of the compound planet gear arrangement increases. Additionally the weight to gear ratio as well as the manufacturing costs increases.

Figure 11:
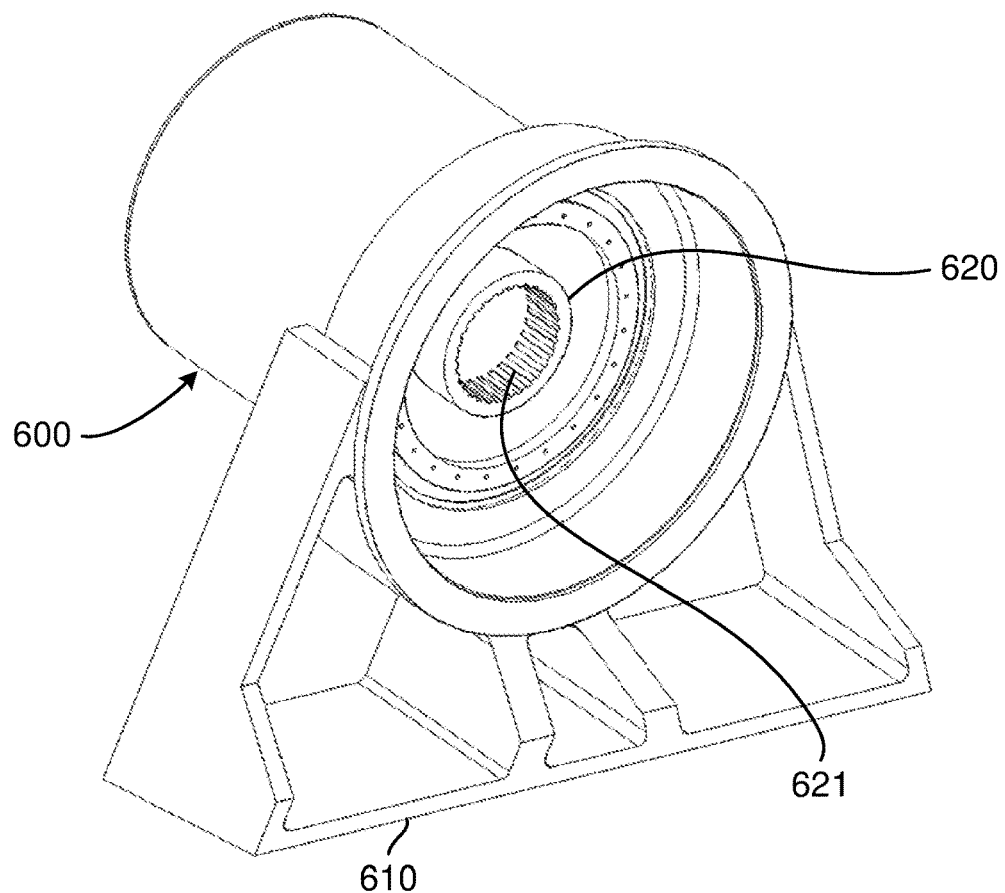
FIG. 11 is a perspective view illustrating some parts of an input module, which may form part of a drive train arrangement according to the invention.

FIG. 11 illustrates an input module 600 which is fixed to a base frame 610. The input module 600 corresponds to input module 2 shown in FIGS. 1a and 1b. When installed in e.g. a wind mill (not shown), the base frame 610 is fixed to the nacelle (not shown) of the wind mill. The input module 600 further comprises a hollow input shaft 620 which is fixed to a mounting disc (not shown) for fixation of a wind turbine (not shown). The input shaft 620 is provided with internal splines 621 which corresponds to external splines 403 on a first step input shaft 404 of a first step gear module 400 shown in FIG. 12.

Figure 12:
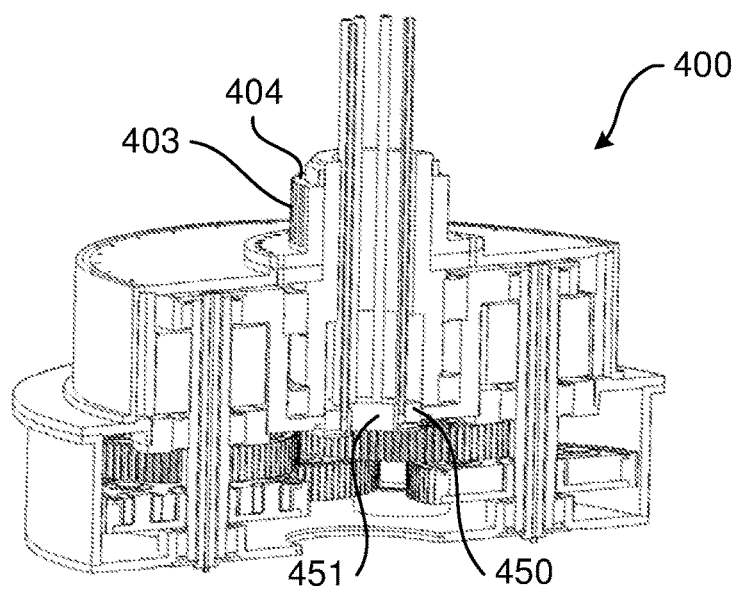
FIG. 12 is a semi section in perspective illustrating the eight stepped and stacked compound planet gear arrangement shown in FIG. 10 with some parts removed.

FIG. 12 illustrates the eight stepped and stacked compound planet gear arrangement 400 shown in FIG. 10 and being the first gear step module in FIGS. 1a and 1b. After removal of the centring shaft 455 and adjustment sun wheel 4 and closing the hole in the centring unit 450 by a lid (not shown), this allows the input gear of the second gear step module to fit into this, the first gear module of the drive train 1 in FIGS. 1a and 1b. The gear step module 400 is also provided with splines 403 in order to receive torque from the input module 2, 600 and transfer torque to the ring gear of the first gear module.

Figure 13:
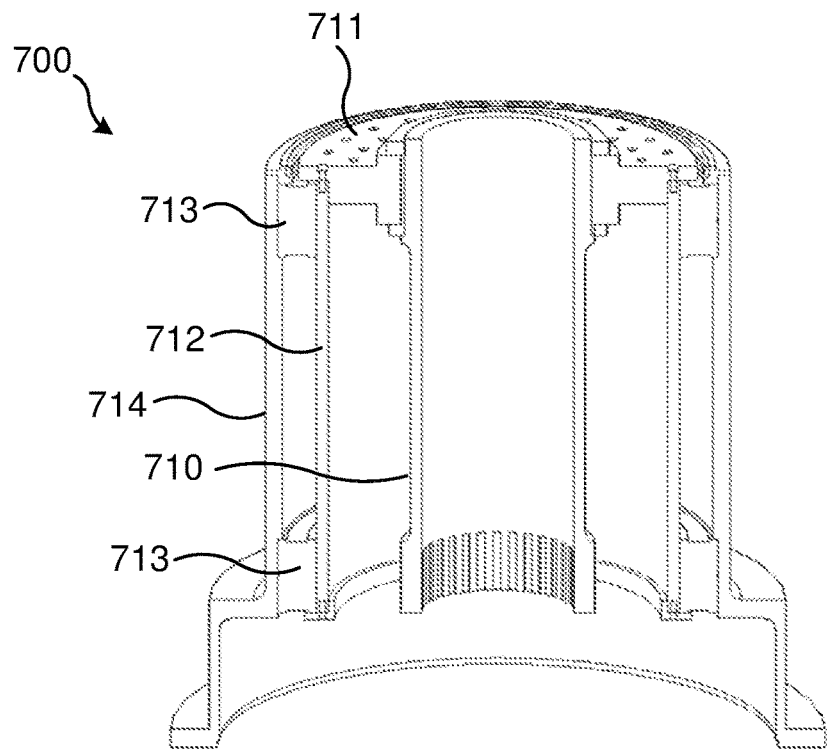
FIG. 13 is a section in perspective illustrating an input module.
Figure 14:
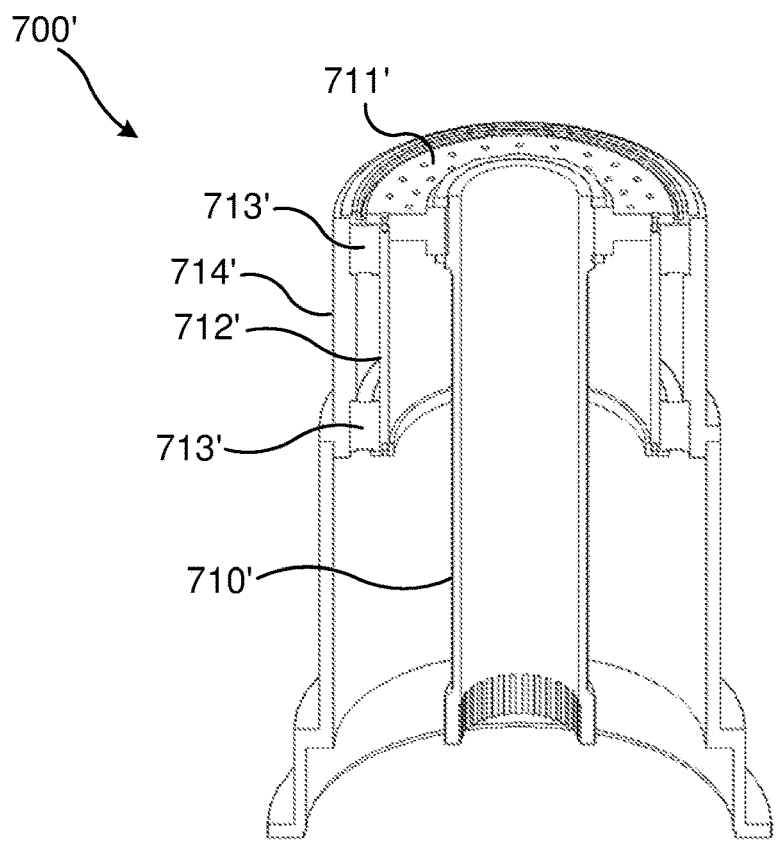
FIG. 14 is a corresponding view illustrating an alternative input module.

FIGS. 13 and 14 illustrate respective embodiments of an input module 700, 700′. The input module 700, 700′ comprises a central hollow inner shaft member 710, 710′, which is fixed to an annular mounting disc 711, 711′. When used at a wind mill, the mounting disc 711, 711′ is used for fixing the turbine blades (not shown) of the wind turbine to the drive train arrangement. The mounting disc 711, 711′ is at its periphery fixed to an outer hollow shaft member 712, 712′. The outer shaft member 712, 712′ is arranged coaxially around the inner shaft member 711, 711′. The outer shaft member 712, 712′ is further journaled in strong bearings 713, 713′ to a solid casing or housing 714, 714′ of the input module 700, 700′. Since the housing 714, 714′ is fixed to the nacelle (not shown) also the bearings 713, 713′ are indirectly fixed to the nacelle. By this means the outer shaft member 712, 712′ is strongly supported and it may sustain and absorb strong axial, radial and bending forces acting on the mounting disc 711, 711' when the turbine is exposed to strong, transient and turbulent wind flows. Grace to the great resistance and strength of the outer shaft member 714, 714', the inner shaft member 710, 710' may be made comparatively weak and may be dimensioned mainly to transmit torsional forces from the mounting disc 711, 711' to the first gear step module. By this means it is even possible to allow some degree of torsional elasticity of the inner shaft member 710, 710', such that the negative impact of heavily varying wind flows on the gear arrangement is reduced. Such a torsional flexibility of the inner shaft member 710, 710' thus acts in combination with the shock absorbing planet gear units to protect the gear arrangement and to smoothen the drive of the gear arrangement and generator.

The arrangement of the coaxial shaft members 710, 710', 712, 712' being supported by the housing 714, 714' also allows the input module to be designed with comparatively small dimensions.

It should be noted that the advantageous input module, in some applications, may be used separately as a stand alone unit for connecting a driving source, such as a turbine or the like directly to the input shaft of a utility, such as a generator, without any intermediate gear arrangement. Correspondingly, according to one aspect of the invention an input module for connecting a driving device to a driven device comprises and inner tubular shaft, an outer tubular shaft and a surrounding housing, wherein the inner tubular shaft is arranged coaxially inside the outer tubular shaft and the outer tubular shaft is journaled in bearings to the housing and wherein a respective first end of the inner and outer tubular shafts are connected by means of a mounting disc arranged for fixation of the driving device.

Figures 15, 16:
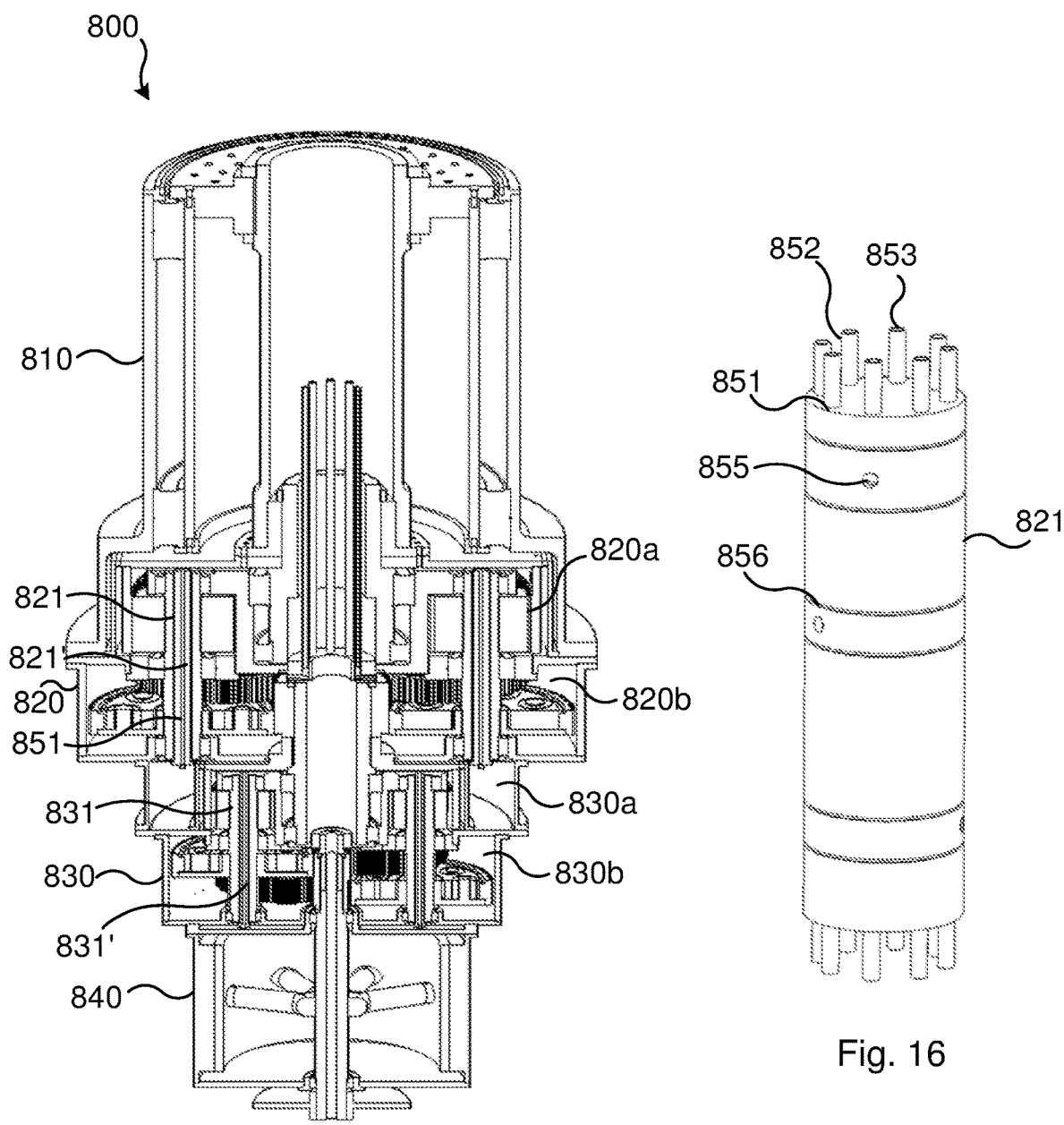
FIG. 15 is a semi section in perspective through an entire drive train arrangement and its lubrication alternatives according to an embodiment of the invention.
FIG. 16 is a perspective view in enlarged scale illustrating a detail of the lubrication and control alternatives according to an embodiment of the invention.

FIG. 15 illustrates the entire drive train arrangement 800 according to one embodiment. The drive train arrangement 800 corresponds to the arrangement shown in FIGS. 1*a* and 1*b* and comprises an input module 810, a first gear step module 820, a second gear step module 830 and a generator or motor module 840. The modules are fixed to each other axially one to the other. Each module further encloses a sealed interior space or a compartment, such that the different compartments may contain different lubrication and/or cooling media and other differing atmospheres e.g. cooling gases as may be needed. Each compartment of the first gear step module 820 and the second gear step module 830 is further divided into sub-compartments 820*a*, 820*b* and 830*a*, 830*b* respectively. The sub-compartments are arranged one after the other in the axial direction of the drive train arrangement and are mutually separated by means of interior walls extending perpendicular to the longitudinal direction and forming part of the housing of the respective module. This allows for that each sub-compartment and the bearings arranged therein may be individually provided with lubrication and cooling. For this purpose, the housings of the respective modules may be provided with pipes, tubes and/or channels for conducting lubrication and/or cooling media.

As indicated in FIG. 15, the first step module 820 and the second step module 830 comprises a number of planet shafts 821, 831 forming part of a respective shock absorbing planet unit as described above. The planet shafts 821, 831 are rotationally and coaxially arranged around a respective control rod 821, 831.

FIG. 16 illustrates one such a control rod 821 in enlargement and in greater detail. As seen in FIG. 16, the control rod 821 may be provided with axial channels 851, pipes 852, and wires 853. Such channels, pipes and wires may be used for sensing and monitoring different conditions of e.g. the bearings, the lubrication and the atmosphere in within the different compartments. These components may also be used for adjusting such conditions, e.g. by adding lubrication and/or cooling media. In order for the channels, pipes and wires to debouch at a desired position in the respective compartment, the control rods 821, 831 may be provided with radial channels 855 extending from the axial channels 851 to the periphery of the control rod 821. Additionally, the envelope surface of the control rods 821 may exhibit circumferential groves 856 for allowing sealings, such as o-rings to define certain zones within the compartments. Such zones may be used e.g. for monitoring and regulating the atmosphere and conditions of a bearing or the like. The control rods 821, 831 may be formed in any suitable material such as polymer material, metal or a combination thereof.

A similar control rod (not shown) may also be used for receiving the wires 451 and pipes and/or other control means which extend axially through the hollow input shaft 404 shown in FIG. 10 and the inner shaft member 710, 710' shown in FIGS. 13 and 14 to the mounting disc 711, 711 and a hub of a wind turbine mounted thereto.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A compound planet gear arrangement having a ring gear, at least two planet gear units and a sun wheel, wherein each planet gear unit comprise a primary planet gear with primary planet teeth meshing with the ring gear and a secondary planet gear with secondary planet teeth meshing with the sun wheel, the secondary planet gear being axially connected with the primary planet gear and having a diameter which is larger than the diameter of the primary planet gear, characterized in that each planet gear unit comprises a shock absorbing transmission arrangement which is arranged to allow a limited elastic rotation of the secondary planet teeth relative to the primary planet teeth.

2. A compound planet gear arrangement according to claim 1, wherein each transmission arrangement comprises a number of elastic members arranged to transmit torque between the primary planet teeth and the secondary planet teeth.

3. A compound planet gear arrangement according to claim 2, wherein the elastic members are arranged at the secondary planet gear.

4. A compound planet gear arrangement according to claim 3, wherein each transmission arrangement comprises a drive disc which is fixed to a planet shaft connecting the primary planet gear with the secondary planet gear and which is provided with a number of axially extending pins fixed to the drive disc; and a cog wheel member provided with peripheral teeth and comprising a transmission disc provided with a number of openings corresponding to the number of pins, wherein an annular elastic member is received in each opening and a respective pin is received in each elastic member.

5. A compound planet gear arrangement according to claim 4, wherein the peripheral teeth of the cog wheel member forms the secondary planet teeth and the drive disc is non-rotationally fixed to the primary planet gear by means of a planet shaft.

6. A compound planet gear arrangement according to claim 1, wherein each planet gear unit, together with bearings forms a planet gear module.

7. A compound planet gear arrangement according to claim 6, wherein the planet gear module further comprises at least one bearing hub for mounting a bearing to a housing of the compound planet gear arrangement.

8. A compound planet gear arrangement according to claim 1, wherein the compound planet gear arrangement is a stacked planet gear comprising an even number of planet gear units with the primary planet gears arranged in a first radial plane and wherein half of the secondary planet gears are arranged in a second radial plane and half of the secondary planet gears are arranged in a third radial plane being arranged at a greater distance from the first radial plane than the second radial plane.

9. A compound planet gear arrangement according to claim 1, wherein the transmission arrangements are arranged to allow the limited elastic rotation equally in both rotational directions.

10. A compound gear arrangement according to claim 1, wherein the elastic members are not preloaded or equally preloaded in both rotational directions.

11. A compound planet gear arrangement according to claim 1, wherein the transmission arrangements are arranged to allow a limited elastic relative rotation of at least 1° and preferably in the range of 2-4°.

12. A drive train arrangement, comprising a first compound gear arrangement according to claim 1 forming a first gear step and a second compound gear arrangement according to claim 1 forming a second gear step of the drive train arrangement.

13. A drive train arrangement according to claim 12, wherein the sun wheel of the first compound planet gear arrangement is connected to the ring gear of the second compound planet gear arrangement.

14. A drive train arrangement according to claim 12, wherein the sun wheel of the second compound planet gear arrangement or a sun wheel of a further compound planet gear arrangement is connected to a rotor of an electrical generator or motor or another utility appliance.

15. A drive train arrangement according to claim 12, comprising a housing which is divided into at least a first compartment receiving the first compound planet gear arrangement and a second compartment receiving the second compound planet gear arrangement, wherein the compartments are sealed from each other, for allowing different lubrication media to serve the respective compartments.

16. A drive train arrangement according to claim 15, wherein at least one of the first and second compartments is divided into at least two sub-compartments.

17. A drive train arrangement according to claim 12, comprising an input shaft which comprises a first tubular shaft member which is connected to the ring gear of the first compound planet gear arrangement and a second tubular shaft member which is arranged co-axially around the first tubular shaft member and fixed to the first tubular shaft member by means of an annular mounting disc, wherein the second tubular shaft member is journaled in bearings to the housing of the drive train arrangement.

18. A drive train arrangement according to claim 17, wherein the first tubular shaft member is comparatively weak and arranged mainly to transmit torque from the mounting disc to the ring gear of the first compound planet gear arrangement and the second tubular shaft member, together with the housing is arranged to absorb axial, radial and bending forces from the mounting disc.

19. A drive train arrangement according to claim 17, wherein a turbine is fixed to the mounting disc.

20. A drive train arrangement according to claim 12, wherein the first compound planet gear arrangement, the second compound planet gear arrangement and the input shaft are arranged as separate modules which are arranged to be modularly assembled and de-assembled module per module.

21. A drive train arrangement according to claim 17, wherein control means for controlling a turbine mounted to the mounting disc extends from the first compound planet gear arrangement, axially through the first tubular shaft member of the input shaft to the mounting disc.

* * * * *